United States Patent
Tamir et al.

(10) Patent No.: US 9,563,431 B2
(45) Date of Patent: Feb. 7, 2017

(54) TECHNIQUES FOR COOPERATIVE EXECUTION BETWEEN ASYMMETRIC PROCESSOR CORES

(71) Applicant: Intel Corporation, Santa Clara, CA (US)

(72) Inventors: Eliezer Tamir, Bait Shemesh (IL); Ben-Zion Friedman, Jerusalem (IL)

(73) Assignee: INTEL CORPORATION, Santa Clara, CA (US)

( * ) Notice: Subject to any disclaimer, the term of this patent is extended or adjusted under 35 U.S.C. 154(b) by 197 days.

(21) Appl. No.: 14/583,308

(22) Filed: Dec. 26, 2014

(65) Prior Publication Data

US 2016/0188344 A1 Jun. 30, 2016

(51) Int. Cl.
*G06F 9/00* (2006.01)
*G06F 9/38* (2006.01)
*G06F 9/46* (2006.01)
*G06F 1/32* (2006.01)
*G06F 13/00* (2006.01)

(52) U.S. Cl.
CPC ............. *G06F 9/3867* (2013.01); *G06F 1/32* (2013.01); *G06F 9/3802* (2013.01); *G06F 9/46* (2013.01)

(58) Field of Classification Search
CPC ............. G06F 9/38; G06F 13/24; G06F 9/00; G06F 13/00
USPC .. 712/244, 228; 718/107–108, 103; 710/260
See application file for complete search history.

(56) References Cited

U.S. PATENT DOCUMENTS

| | | | | |
|---|---|---|---|---|
| 6,269,419 B1 * | 7/2001 | Matsuyama | .......... | G06F 9/4818 710/260 |
| 6,298,431 B1 * | 10/2001 | Gottlieb | .............. | G06F 9/30116 712/28 |
| 6,898,696 B1 * | 5/2005 | Cheong | ................. | G06F 9/3863 712/206 |
| 2007/0079150 A1 * | 4/2007 | Belmont | ............... | G06F 1/3228 713/300 |
| 2007/0260859 A1 * | 11/2007 | Chen | ................... | G06F 11/3466 712/227 |
| 2009/0172369 A1 * | 7/2009 | Stillwell, Jr. | ......... | G06F 9/3824 712/228 |

(Continued)

OTHER PUBLICATIONS

Happe et al., "A self-adaptive heterogeneous multi-core architecture for embedded real-time video object tracking", J. of Real-Time Image Proc., (2011), 16 pages.

*Primary Examiner* — Christopher Shin

(57) ABSTRACT

Various embodiments are generally directed to techniques for cooperation between a higher function core and a lower power core to minimize the effects of interrupts on a current flow of execution of instructions. An apparatus may include a lower power core comprising a first instruction pipeline, the lower power core to stop a first flow of execution in the first instruction pipeline and execute instructions of a handler routine in the first instruction pipeline to perform a first task of handling an interrupt; and a higher function core comprising a second instruction pipeline, the higher function core to, following the performance of the first task, schedule execution of instructions of a second task of handling the interrupt in the second instruction pipeline to follow a second flow of execution in the second instruction pipeline, the first task more time-sensitive than the second task. Other embodiments are described and claimed.

25 Claims, 13 Drawing Sheets

(56) References Cited

U.S. PATENT DOCUMENTS

| | | | |
|---|---|---|---|
| 2009/0217019 A1* | 8/2009 | Gross | G06F 9/3851 712/244 |
| 2009/0222654 A1* | 9/2009 | Hum | G06F 13/24 713/100 |
| 2010/0106876 A1* | 4/2010 | Nakahashi | G06F 13/26 710/261 |
| 2011/0145461 A1* | 6/2011 | Zhao | G06F 9/4812 710/267 |
| 2014/0068289 A1* | 3/2014 | Beck | G06F 1/3203 713/320 |
| 2014/0101663 A1* | 4/2014 | Dickson | G06F 9/5038 718/103 |
| 2014/0351828 A1* | 11/2014 | Lee | G06F 9/4812 718/108 |
| 2015/0089249 A1* | 3/2015 | Hannon | G06F 9/5094 713/300 |
| 2015/0121388 A1* | 4/2015 | Chang | G06F 9/4881 718/103 |
| 2015/0186160 A1* | 7/2015 | Arora | G06F 12/0864 713/1 |
| 2015/0356035 A1* | 12/2015 | Singh | G06F 1/3203 712/244 |
| 2016/0188344 A1* | 6/2016 | Tamir | G06F 9/3867 712/244 |

\* cited by examiner

TECHNIQUES FOR COOPERATIVE EXECUTION BETWEEN ASYMMETRIC PROCESSOR CORES

BACKGROUND

It has become commonplace to employ processor components that incorporate one or more relatively high function cores within a computing device. Such higher function cores may incorporate numerous processing features to form a relatively deep pipeline in which multiple executable instructions may be in various stages of execution at the same time. Such higher function cores may also incorporate and/or be coupled to one or more relatively large caches to speed the retrieval and storage of both data and executable instructions as part of ensuring that the next executable instructions to enter into the pipeline for execution are more readily available to the core from within such a cache when needed. Such higher function cores may further employ a relatively sophisticated instruction prefetch algorithm with a relatively sophisticated form of branch prediction to increase the likelihood that the executable instructions available within the cache include the next executable instructions to be executed. However, many of such additions and improvements to the architecture of a high function processor core may be entirely undone as a result of an event that requires a change in a current flow of execution of instructions, such as hardware interrupts and exceptions.

DETAILED DESCRIPTION

Figure 1:
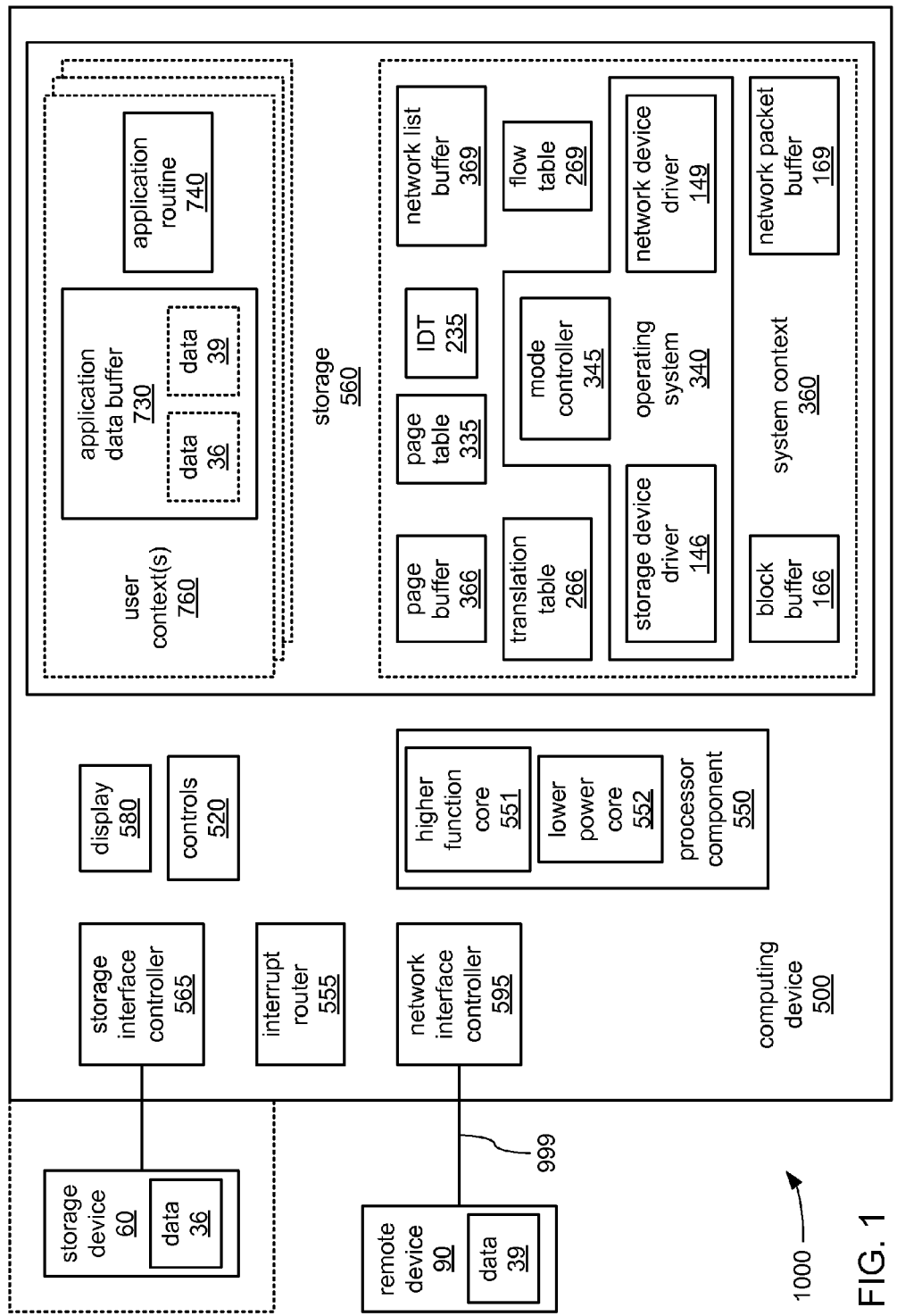
FIG. 1 illustrates an example embodiment of a processing system.

Various embodiments are generally directed to techniques for cooperation between a higher function core and a lower power core of a processor component to minimize the effects of interrupts on a current flow of execution of instructions. For sake of clarity given the differing meanings ascribed to the word "interrupt" in various different computing architectures, the term "interrupt" as used herein denotes hardware interrupts generated by hardware components coupled to a processor component and exceptions generated by the internal logic of the processor component itself, including at least page faults. At least some interrupts are directed to the lower power core which may have a simpler architecture than the higher function core, including a smaller cache and/or a less complex instruction pipeline than the higher function core. The lower power core may execute instructions of a handler routine associated with a received interrupt to perform one or more relatively time-sensitive tasks and/or tasks requiring frequent accesses to non-sequential address locations. Such tasks may involve movement of relatively small quantities of data, interaction with status and/or control registers of a hardware component, and/or protocol conversions. In so doing, the lower power core may or may not assemble lists of separated smaller quantities of data belonging to a larger quantity of data and/or may determine the destination to which those smaller quantities of are to be directed. In some embodiments, following the performance of such tasks, the lower power core may signal the higher function core with an indication that an additional task associated with one or more received interrupts is to be performed by the higher function core. In other embodiments, the lower power core may make information needed for the higher function core to perform the additional task at available in a manner that allows the higher function core to locate that information during polling conducted by the higher function core among its normally scheduled tasks. Such an additional task to be performed by the higher function core may not be as time-sensitive as those performed by the lower power core such that the higher function processor core may be able to include the additional task in it normal scheduling of tasks in executing portions of an operating system and/or of one or more application routines.

The lower power core and the higher function core may both be incorporated as a matched pair into a single processing component. In some embodiments, the processor component may be architected in a manner that enables the use of either or both of the lower power core and the higher function core to be used at various times without an operating system, device drivers and/or application routines executed by the processor component being aware of which one(s) of these two cores are executing instructions of each at any given time. However, in other embodiments, it may be the operating system itself that directs which core is used, or may even direct that both cores are used. In some embodiments, the higher function core and the lower power core may be capable of executing substantially the same instruction set. However, in other embodiments, there may be some degree of difference between the instruction sets executed by each of the lower power core and the higher function core. By way of example, the higher function core may have high math instructions and/or other particular instructions not supported by the lower power core. An operating system, device driver and/or particular application routines may be aware of the presence of both of these cores and/or when one or the other is currently operated, as well as aware of the differences in the instruction sets supported by each core. In each of these embodiments, the permissions given by the operating system to the processor component to access various ranges of addresses at which executable instructions for the operating system, device drivers and/or application routines may be stored may apply equally to both of these cores. Thus, either of the lower power core and the higher function core may be able to access the same stored instructions and/or the same stored data. The lower power core and the higher function core may employ any of a variety of types of communications therebetween to ensure coherency therebetween in executing instructions.

The lower power core may incorporate a smaller cache than the higher function core and/or a simpler instruction pipeline with fewer stages than the higher function core which may be capable of out-of-order execution. Thus, even in embodiments in which the lower power core may be capable of executing substantially the same instruction set as the higher function core, such execution by the lower power core may be at a lower rate of consumption of electric power and at a slower speed. However, with a smaller cache and/or a simpler instruction pipeline, the loss of efficiency caused in executing instructions of a current flow of execution by an interrupt is not as great as for the higher function core. The processor component may be configurable to operate in various modes, including a mode in which only one or the other of the lower power core and the higher power core are operated. During such modes, electric power and/or a processor clock signal may be removed from the one of these two cores that is not operated to reduce power consumption and/or to control the amount of heat dissipated by the processor component. However, the processor component may also be configurable to operate in a mode in which both of these cores may be operated simultaneously. Further, the processor component may switch between two more of these mode based on current demand for processing resources. In embodiments in which the lower power core and the higher function core execute substantially the same instruction set, the processor component may effect changes among such modes autonomously, and without involvement of an operating system or a device driver. However, in other embodiments, changes among such modes may be at the direction of the operating system which may be deemed to have a better ability to monitor factors that may need to be taken into account in selecting a mode to change to and/or when to make such changes.

By way of example, at times when the higher function core is operated, but there is relatively low demand on the processing resources of the higher function core, the processor component may be switched (either under the control of the process component or under the control of the operating system) to a mode in which the higher function core ceases to be operated and the lower power core is operated to execute instructions of an operating system, device drivers and application routines in lieu of the higher function core. At a later time when the demand for processing resources increases to approach a level that the lower power core cannot support, then the processor component may be switched to a mode in which the higher function core is again operated. Further, such operation of the higher power core may be in addition to continued operation of the lower power core with both cores cooperating to handle interrupts in a manner in which the lower power core receives indications of the interrupts and performs at least time-sensitive tasks associated with those interrupts.

As an example of the lower power core and the higher function core cooperating to handle an interrupt, an indication of an interrupt originating from a network interface controller (NIC) indicating receipt of data may be routed to the lower power core for the lower power core to at least initially handle. The lower power core may begin the handling of the interrupt by accessing an interrupt description table (IDT) to determine the address of an handler routine associated with interrupts from the NIC, and then may begin executing the instructions of that handler starting at that address. In so doing, the lower power core may access one or more received packets of data stored by the NIC within a network packet buffer at a set of storage locations accessible to both the NIC and the processor component. The lower power core may examine information within the header of one or more of the packets to retrieve an identifier of a process, a routine, a thread or other type of flow of execution of instructions, and may employ a table of such identifiers to determine what flow of execution is the intended destination of the data within the one or more packets. As the lower power core retrieves such identifiers from the header of each packet stored in the network packet buffer, the lower power core may, for each different flow of execution identified as a destination, generate a linked list of pointers to the packets within the network packet buffer that are destined for that flow of execution.

In some embodiments, when the lower power core determines that a threshold for enough packets of data destined for a particular flow of execution has been reached, the lower power core may signal the higher function core with an indication of data having been received for use by a particular flow of execution, and may providing the higher function core with access to the linked list for those packets and an indication of which flow of execution is the destination of the packets pointed to in the linked list. In response to the indication, the higher function core, in executing a portion of the operating system associated with a network stack, may then use the linked list to extract the data from the one or more received packets pointed to by the linked list and may store that data within a data buffer associated with that flow of execution (e.g., a data buffer associated with an application routine). However, in other embodiments, the higher power core may, on a scheduled basis, recurringly poll the one or more linked lists of packets that are built up by the lower power core for different flows of execution. When the higher function core determines that the threshold for enough packets of data destined for a particular flow of execution has been reached, the higher function core may then use the linked list associated with that particular flow of execution to extract data from the one or more packets pointed to by the linked list and may store that data within the buffer associated with that flow of execution.

In some embodiments, upon executing the handler routine associated with interrupts from the NIC, the lower power core may restrict the frequency of further interrupts from the NIC by temporarily disabling the ability of the NIC to issue further interrupts. This may be done to prevent the tasks performed by the lower power core in response to one interrupt from the NIC from being interrupted by another interrupt from the NIC as a result of receiving more packets. Instead, the lower power core may temporarily engage in polling the NIC for an indication of receiving more packets. Upon completion of handling the current interrupt from the NIC, the lower power core may re-enable the ability of the NIC to issue an interrupt. Such toggling between using interrupts to obtain notice of an event (e.g., receiving further packets) and using polling to do so may be referred to as "semi-polling."

In embodiments where the lower power core signals the higher function core to perform one or more tasks as part of handling an interrupt, such signaling of the higher function core may be through any of a variety of mechanisms. By way of example, core-to-core interrupt or message-passing functionality may exist. Further such signaling may or may not be treated by the higher function core in an interrupt-like manner. By way of example, the higher function core may respond to such signaling by the lower power core by scheduling the handler-related task to be performed by the higher function core among other tasks to be performed by the higher function core that may be entirely unrelated to handling any interrupt.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result.

These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of an embodiment of a processing system 1000 incorporating one or more of a storage device 60, a remote device 90 and a computing device 500. The computing device 500 may exchange data 36 with the storage device 60 in the form of blocks of the data 36 via a coupling through a storage interface controller 565 by which the computing device 500 may control operation of the storage device 60. In various embodiments, the storage device 60 may be external to the computing device 500 or may be incorporated into the computing device 500 (as indicated with dotted lines). Alternatively or additionally, the computing device 500 may exchange data 39 with the remote device 90 via a network 999 through a network interface controller (NIC) 595 using any of a variety of protocols, including protocols in which portions of the data 39 are exchanged in network packets.

The computing device 500 may be operated to execute one or more application routines 740 to perform any of a variety of tasks. Each of the application routines 740 may be any of a variety of types of application, including and not limited to, word processors, spreadsheet editors, CAD/CAM software, website browsers, audio/visual recording and/or playback software, photograph editors, etc. As part of enabling such execution of the one or more application routines 740, the computing device 500 may also be operated to execute an operating system 340. The operating system 340 may be any of a variety of types of operating system that provides an operating environment to support execution of various routines, including the one or more application routines 740. The computing device 500 may be further operated to execute one or more device drivers that may extend the functionality of that operating environment to take advantage of one or more components of the computing device 500 (e.g., the storage interface controller 565 and/or the NIC 595) and/or one or more other devices that may be coupled to the computing device 500 (e.g., the storage device 60 and/or the remote device 90).

More generally, each of these devices 60, 90 and 500 may be any of a variety of types of computing device, including without limitation, a desktop computer system, a data entry terminal, a laptop computer, a netbook computer, a tablet computer, a handheld personal data assistant, a smartphone, smart glasses, a smart wristwatch, a digital camera, a smart card incorporating a processor component, a body-worn computing device incorporated into clothing, a computing device integrated into a vehicle (e.g., a car, a bicycle, a wheelchair, etc.), a server, a cluster of servers, a server farm, etc.

As depicted and discussed, at least the computing devices 90 and 500 may exchange signals conveying data, and such exchanges may occur through a network 999. However, one or both of these computing devices may also exchange data with still other computing devices (not shown) via the network 999. In various embodiments, at least the network 999 may be a single network possibly limited to extending within a single building or other relatively limited area, a combination of connected networks possibly extending a considerable distance, and/or may include the Internet. Thus, at least the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

In various embodiments, the computing device 500 may incorporate one or more of the processor component 550, a storage 560, controls 520, an interrupt router 555, a display 580, the storage controller 565 to couple the computing device 500 to the storage device 60 and the NIC 595 to couple the computing device 500 to the network 999. The processor component 550 may incorporate one or more of a higher function core 551 and a lower power core 552. Portions of the storage 560 made up of ranges of addresses of storage locations may be designated as a system context 360 and one or more user contexts 760. Within the system context 360 may be stored one or more of the operating system 340, a page table 335, a page buffer 366, a network queue buffer 369, an interrupt descriptor table (IDT) 235, a translation table 266, a flow table 269, a storage device driver 146, a network device driver 149, a block buffer 166 and a network packet buffer 169. As depicted, the operating system 340 may include a mode controller 345. Further, although in some embodiments the storage device driver 146 and/or the network device driver 149 may be provided by vendor(s) other than a vendor of the operating system 340, in terms of the manner in which they interact, the storage device driver 146 and/or the network device driver 149 may be deemed components of the operating system 340, as depicted. Within each of the one or more user contexts 760 may be stored one or both of an application routine 740 and an application data buffer 730. Within the application data buffer 730 may be designated locations within which copies of at least portions of the data 36 and/or 39 may be stored.

The higher function core 551 and the lower power core 552 may both be capable of executing substantially the same instruction set, thereby allowing either or both of the cores 551 and 552 to execute instructions of any of the one or more application routines 740, the operating system 340, and/or device drivers such as the storage device driver 146 and/or the network device driver 149. Alternatively, there may be a subset of instructions that may be executable by one of the higher function core 551 or the lower power core 552 that cannot be executed by the other. As previously discussed, the processor component 550 may be architected in a manner that enables the use of either or both of the cores 551 and 552 at various times without routines made up of executable instructions, such as the operating system 300, being made aware of which of the cores 551 and/or 552 are executing instructions at any given time. Alternatively, a device driver, a component of the operating system 340 and/or an application routine 740 may direct the use of either or both of the cores 551 and 552 at various times. Again, the permissions given to the processor component 550 to access various ranges of addresses at which executable instructions and/or data may be stored may apply equally to both of the cores 551 and 552 such that either of the cores 551 or 552 may be able to access the same stored instructions and/or the same stored data.

The lower power core 552 may not be capable of providing as much in the way of processing resources as the higher function core 551, but the lower power core 552 may be capable of conserving electric power by consuming it at a lower rate than the higher function core 551. The mode controller 345 of the operating system 340 may take advantage of such differences between the lower power core 552 and the higher function core 551 by placing the processor component 550 in any of more than one modes in response to various conditions observed by the operating system 340 and/or various device drivers during the operation of the computing device 500. Among those modes may be a mode in which only the higher function core 551 is operated to execute instructions, a mode in which only the lower power core 552 is operated to execute instructions, and a mode in which both of the cores 551 and 552 are operated to execute instructions.

In some embodiments, the mode controller 345 may monitor the level of demand for processing resources and may dynamically place the processor component 550 in any of multiple modes depending on that level. By way of example, where the demand for processing resources falls to a level that can be provided by the lower power core 552, alone, the mode controller 345 may place the processor component 550 into a mode in which the lower power core 552 executes instructions, but the higher function core 551 does not. Further, where the demand for processing resources rises to a level approaching the upper limit of what the lower power core 552 is able to provide, the mode controller 345 may place the processor component 550 into a mode in which both of the higher function core 551 and the lower power core 552 execute instructions in a cooperative manner, including instructions associated with the handling of interrupts.

Figure 2:
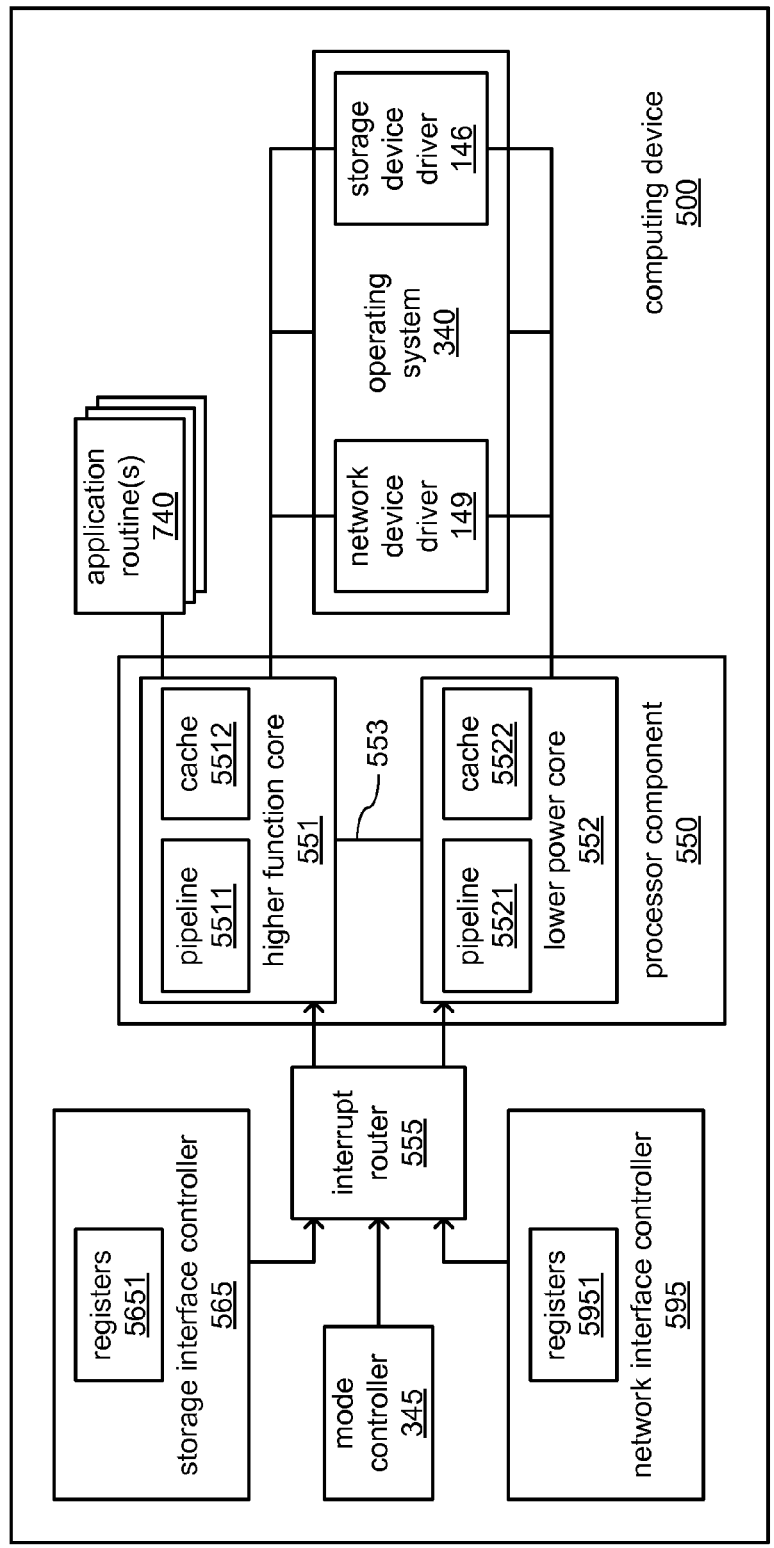
FIG. 2 illustrates an example distribution of handling of interrupts between cores of a processor component.

FIG. 2 illustrates aspects of an example embodiment of a mode of the processor component 550 in which the higher function core 551 and the lower power core 552 execute instructions in such a cooperative manner in more detail. As depicted, the higher function core 551 and the lower power core 552 may each incorporate an instruction pipeline 5511 and 5521, respectively. As recognizable to those skilled in the art, each of the instruction pipelines 5511 and 5521 may incorporate various portions of instruction execution logic that each perform various aspects of executing a series of executable instructions making up a flow of execution, such as a routine of the operating system 340, one of the application routine 740, a device driver, etc. As also depicted, the higher function core 551 and the lower power core 552 may each incorporate a cache 5512 and 5522, respectively. Further, the cores 551 and 552 may be linked by an inter-core interconnect 553 by which one may signal the other with information needed to coordinate the execution of instructions therebetween. As further depicted, each of the storage interface controller 565 and the NIC 595 may incorporate one or more registers 5651 and 5951, respectively, to control various aspects of the functionality and/or monitor the status of each.

In the instruction pipeline 5511 of the higher function core 551, the execution of each instruction may be broken up into a greater quantity of stages that are performed by a correspondingly greater quantity of distinct stages of execution logic than in the instruction pipeline 5521 of the lower power core 552. Alternatively or additionally, each of the stages of the instruction pipeline 5511 of the higher function core 551 may be capable of performing a stage of execution of a greater quantity of instructions simultaneously than each of the stages of the instruction pipeline 5521 of the lower power core 552. Such an ability may be due to the use of wider registers within the higher function core 551 and/or the provision of an ability to simultaneously support more threads of execution of instructions within the higher function core 551. Alternatively or additionally, there may be multiple ones of the instruction pipeline 5511 within the higher function core 551, and the quantity of pipelines instruction 5511 within the higher function core 551 may be greater than the quantity of pipelines instruction 5521 within the lower power core 552 (e.g., there may be more than one of the instruction pipeline 5511 versus a single one of the instruction pipeline 5521). As another alternative, the instruction pipeline 5511 may employ any of a variety of techniques to attempt to keep as many stages of the instruction pipeline 5511 engaged in executing instructions as possible, including speculative execution of instructions to which a branch may be taken and/or out-of-order execution of instructions.

The cache 5512 of the higher function core 551 may be a larger cache able to support the prefetching and/or storage of more instructions than the cache 5522 of the lower power core 552. The cache lines of the cache 5512 may be wider and/or there may be a greater quantity of cache lines within the cache 5512 than in the cache 5522. Alternatively or additionally, a more sophisticated prefetching algorithm and/or organizational architecture may be employed with the cache 5512 of the higher function core 551 than with the cache 5522 of the lower power core 552. By way of example, the higher function core 551 may employ a more sophisticated branch prediction algorithm able to more accurately determine what instructions are to be prefetched under a greater variety of circumstances. By way of another example, the cache 5512 may be 16-way set associative while the cache 5522 may be only 4-way set associative.

As a result of such differences, the higher function core 551 may be better suited to executing multiple routines in a manner in which the execution of the one or more flows of execution of each of those routines is scheduled such that there is a relatively high degree of predictability in the transitions that are made from executing instructions of one flow of execution to executing instructions of another flow of execution. Such higher predictability may result in better utilization of a pipeline capable of having the execution of more instructions "in flight" at any given time. Such higher predictability may also enable better use of branch prediction to select instructions to prefetch and/or may result in more efficient use of the cache lines of a larger cache. Thus, it may be deemed desirable for the instructions of the one or more application routines 740 to be executed by the higher function core 551 (as depicted) and not by the lower power core 552 at times when both of the cores 551 and 552 are operated to execute instructions.

Correspondingly, as a result of such differences, the lower power core 552 may be better suited to executing at least the more time-sensitive portions of handler routines that may be required to be executed in response to the far less predictable occurrence of interrupts. Again, as used herein, the term "interrupt" denotes hardware interrupts that may be received by the processor component 550 from other hardware components (e.g., the storage interface controller 565 or the NIC 595) and exceptions generated by the internal logic of the processor component 550, itself, including page faults. The clearing of a less extensive pipeline with fewer stages to carry out the execution of fewer instructions "in flight" at any given time may reduce the degree of inefficiency that occurs due to each transition from executing one flow of execution to executing another flow of execution as a result of handling an interrupt. Similarly, the evicting of fewer cache lines in a smaller cache may also reduce the inefficiency arising from the lack of use of data stored in a cache that occurs due to such a transition to handle an interrupt. Thus, it may be deemed desirable for the instructions of at least the more time-sensitive portions of handling routines of the operating system 340 and/or of device drivers to be executed by the lower power core 552 (as depicted) and not by the higher function core 551 at times when both of the cores 551 and 552 are operated to execute instructions. However, other portions of handling routines that are more amenable to being executed in more of a scheduled manner may be executed by the higher function core 551 (as also depicted).

As part of enabling the operation of the processor component 550 in any of various modes in which different ones of the cores 551 and 552 may be operated to execute instructions, the mode controller 345 may additionally be operable to dynamically indicate to the interrupt router what interrupts to route to either or both of the cores 551 and 552. This may include hardware interrupts relayed to the processor component 550 through the interrupt router 555 from hardware components of the computing device 500, such as the storage interface controller 565 and the NIC 595. This may also include exceptions generated internally within the processor component 550 such as a page fault. By way of example, at times when the processor component 550 has been placed by the mode controller 345 into a mode in which one of the cores 551 or 552 is operated to execute instructions, but the other is not, the mode controller 345 may signal the interrupt router 555 to route all interrupts to the one of the cores 551 or 552 that is so operated. At other times when the processor component 550 has been placed by the mode controller 345 into a mode in which both of the cores 551 and 552 are operated to execute instructions, the mode controller 345 may signal the interrupt router 555 to route all interrupts received to one or the other of the cores 551 or 552, or to distribute different ones of the interrupts among the cores 551 and 552 in any of a variety of ways. The mode controller 345 may dynamically alter both the current mode of the processor component 550 and the manner in which interrupts are distributed among the cores 551 and 552 based on changes in the level of demand for processing resources, as previously discussed.

Returning to FIG. 1, as recognizable to those skilled in the art, operating system 340 may define a portion of the storage 560 as the system context 360 within which at least components of the operating system 340 and/or various buffers/tables of data maintained by the operating system 340 may be stored with a particular set of access permissions that limit at least the degree to which the one or more application routines 740 are able to read and/or modify those components and/or those buffers/tables of the operating system 340. Further, the operating system 340 may also define a separate one of the user contexts 760 to separately store each of the one or more application routines 740, each with a set of access permissions that limit at least the degree to which each of the one or more application routines 740 may access and/or modify each other and/or any buffers/tables of data maintained by each (if there is more than one user context 760). Such measures may be deemed desirable to limit the extent of undesired actions that may be taken by flawed and/or malicious routines.

As also recognizable to those skilled in the art, the operating system 340, each of the one or more application routines 740, and each device driver, including the storage device driver 146 and/or the network device driver 149, may instantiate, maintain and/or make use of one or more buffers or tables in support of the functions that each performs. Some of such buffers may enable data and/or copies of routines to be passed between processes and/or between separated contexts defined within the storage 560 (e.g., between the system context 360 and one or more of the user contexts 760, and/or among different ones of the user contexts 760, if there is more than one). Also, some of such tables may provide a single location at which addresses and/or other forms of indexing may be used to track the status and/or locations of various pieces of data and/or sets of executable instructions of various routines. By way of example, the operating system 340 may instantiate and maintain the IDT 235 to correlate identifiers of interrupts to addresses within the storage 560 at which associated handler routines may be stored. Alternatively or additionally, either the operating system 340 or each of the application routines 740 may instantiate and/or maintain the application data buffer 730 within each of the one or more user contexts 760 within which a separate one of the one or more application routines 740 may be stored as a mechanism to enable transfers of data and/or instructions into or out of each of the user spaces 760.

As another example, the operating system 340 and/or the storage device driver 146 may implement one or more buffers/tables as part of implementing a virtual addressing scheme in which pages of data and/or executable instructions may be transferred (e.g., "swapped") between storage locations within one or more higher speed volatile storage components (e.g., components of at least a portion of the storage 560) and one or more lower speed non-volatile storage devices (e.g., the storage device 60) on a demand-driven basis. Specifically, the operating system 340 may instantiate and/or maintain the page buffer 366 to buffer the transfer of pages of data and/or instructions between higher speed volatile and lower speed non-volatile storage. In support of employing at least the storage device 60 as a lower speed non-volatile storage device, the storage device driver 146 may instantiate and/or maintain the block buffer 166 to buffer the storage and/or retrieval of blocks of data and/or instructions associated with pages of data and/or instructions to and/or from the storage device 60. The operating system 340 may also instantiate and/or maintain the page table 335 to correlate virtual addresses of pages of data and/or instructions stored within higher speed volatile storage to physical addresses of their storage locations within that storage. Further, in various embodiments, either of the operating system 340 or the storage device driver 146 may instantiate and/or maintain the translation table 266 to correlate virtual addresses of pages of data and/or instructions stored within lower speed non-volatile storage to identifiers of the blocks in which those pages are stored within that storage.

As a further example, the operating system 340 and/or the network device driver 149 may implement one or more buffers/tables as part of implementing a network stack by which data and/or executable instructions may be exchanged between the computing device 500 and one or more other devices via a network (e.g., the network 999). Specifically, the operating system 340 may instantiate and/or maintain the network queue buffer 369 made up of one or more queues of addresses at which received packets may be retrieved as part of buffering the transfer of data and/or instructions between the computing device 500 and another device through the network 999. In some embodiments, each such queue may be implemented as a linked list or any of a variety of other types of data structure for pointing stored packets. In support of employing at least the network interface controller 595 as the interface to the network 999 for such transfers, the network device driver 149 may instantiate and/or maintain the network packet buffer 169 to buffer the transmission and/or receipt of packets conveying data and/or instructions to and/or from another device via the network 999. Further, in various embodiments, either of the operating system 340 or the network device driver 149 may instantiate and/or maintain the flow table 269 of identifiers of flows of execution to aid in correlating packets to flows of execution made up of executable instructions of the operating system 340 and/or of the one or more application routines 740.

Figure 3A:
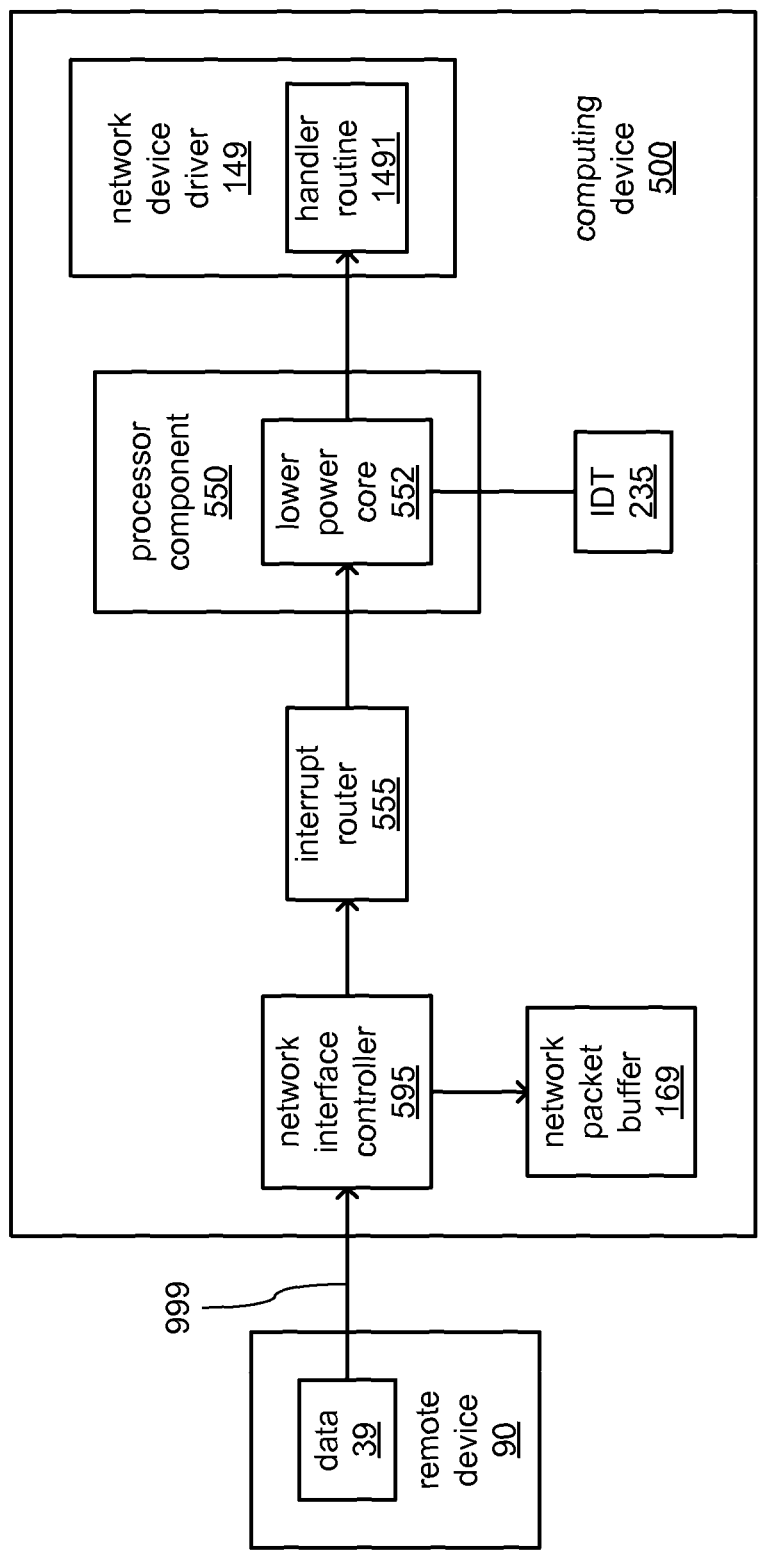
FIGS. 3A, 3B and 3C, together, illustrate an example embodiment of handling a hardware interrupt associated with receiving data via a network.
Figure 3B:
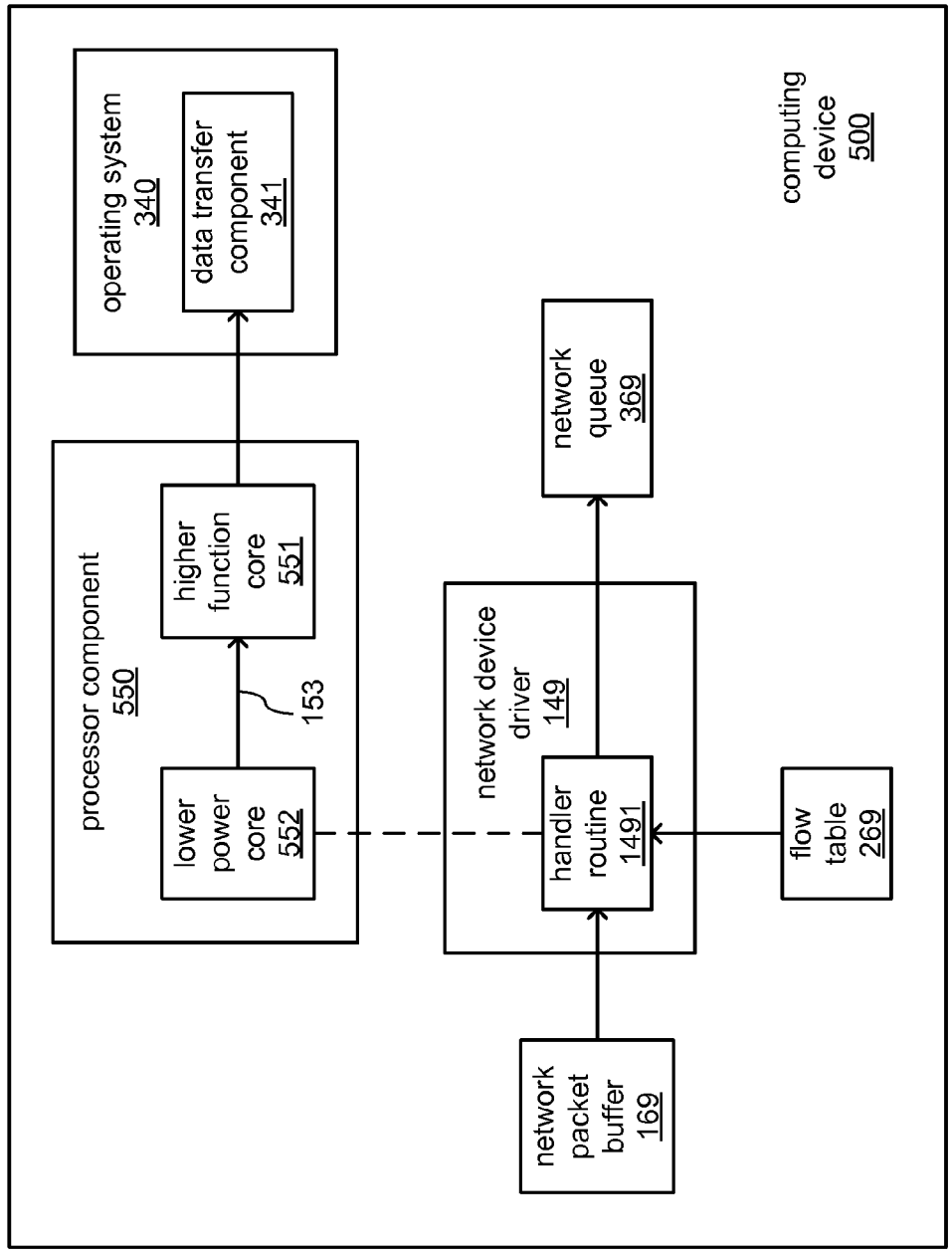
Figure 3C:
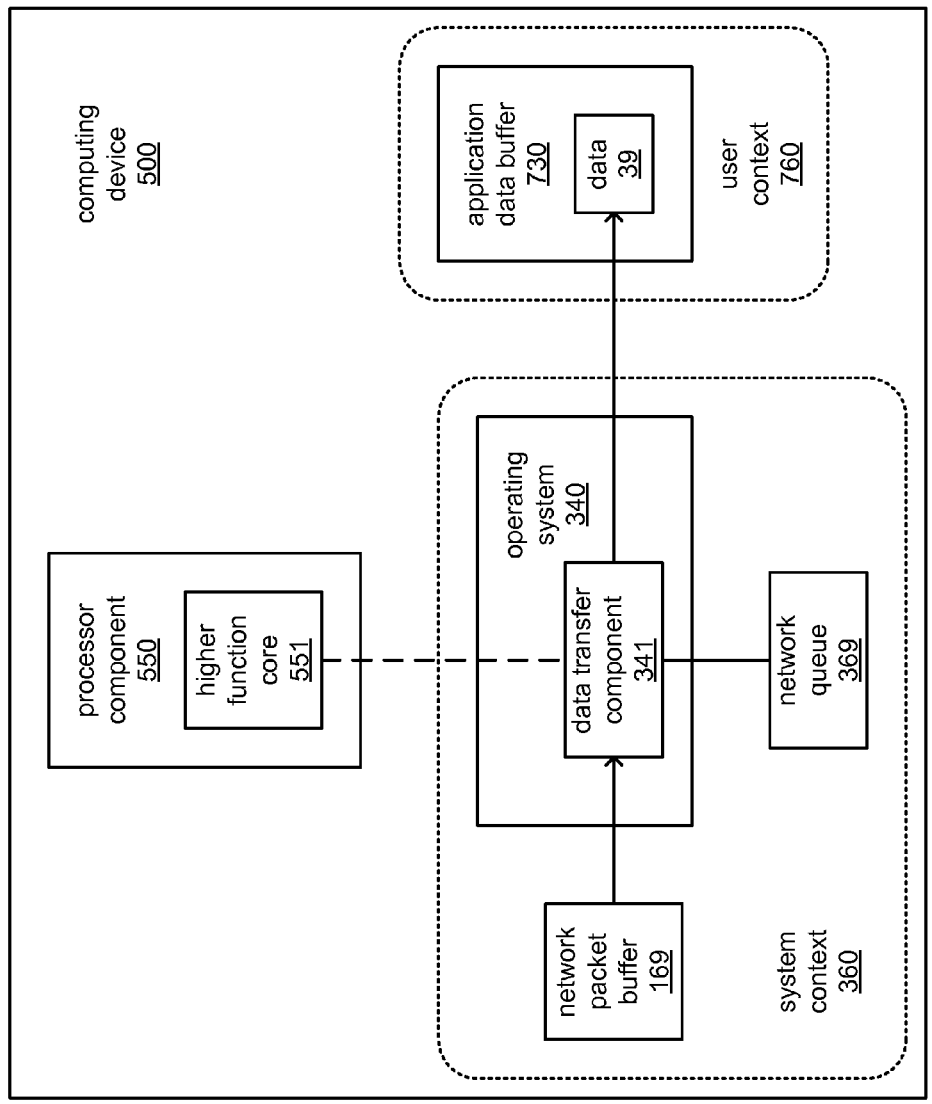

FIGS. 3A-3C, together, depict an example embodiment of cooperation between the cores 551 and 552 of the processor component 550 in handling an interrupt (e.g., a hardware interrupt from the NIC 595) arising from receipt of the data 39 from the remote device 90 via the network 999. As recognizable to those skilled in the art, data transferred through a network may first be broken up into multiple smaller pieces of data that are each separately transmitted through that network in a packet that includes a header providing information on the intended destination device of each of that packet. Although the packets making up the data may be transmitted in an order that corresponds to the order in which those smaller pieces of data are to be assembled to recreate the data at the destination, different ones of those packets may be conveyed along different pathways through a network such that they may be received out of order at the destination device. Thus, in this example embodiment, the packets conveying pieces of the data 39 may be received at the NIC 595 at unpredictable times and in an unpredictable order, which may prompt the generation of more than one hardware interrupt by the NIC 595 at unpredictable times. As will now be explained, the cores 551 and 552 of the processor component 550 may cooperate to execute different sets of instructions to handle such interrupts in a manner that efficiently minimizes disruptions to the flows of execution of the operating system 340 and/or the one or more application routines 740.

Turning to FIG. 3A, the NIC 595 may receive one of the packets conveying one of the pieces of data into which the data 39 has been broken up by the remote device 90 before being transmitted through the network 999. In response to the receipt of that packet, the NIC 595 may store the contents of that packet within the network packet buffer 169, and may issue an interrupt (e.g., a hardware interrupt) that may be received by the interrupt router 555. As recognizable to those skilled in the art, the issuing of a hardware interrupt may entail either switching a voltage level on an electrical conductor extending between at least the NIC 595 and the interrupt router 555 or transmitting an interrupt message through a bus extending therebetween. Where an electrical conductor is used, the interrupt router 555 may receive hardware interrupts on multiple ones of such electrical conductors, each of which may be designated with an identifier that becomes the identifier of the interrupt itself, and that identifier may correlate to a particular handler routine. Where an interrupt message is used, the message itself may itself specify the identifier. Regardless of the exact manner in which the interrupt router 555 receives this interrupt from the NIC 595, the interrupt route 555 may relay an indication of the occurrence of the interrupt to the processor component 550 along with an indicator of the identifier of the interrupt.

As has been discussed, the mode controller 345 may be capable of controlling which of the higher function core 551 and the lower power core 552 receives some or all of the interrupts received by the processor component 550. Again, the mode controller 345 may do this by directing the interrupt router 555 to distribute various interrupts to one or the other or both of the cores 551 and 552. In some embodiments, the interrupt router 555 may route an interrupt to one or the other of the cores 551 or 552 by selected one of multiple electrical conductors through which to relay that interrupt. In other embodiments, the interrupt controller 555 may transmit an interrupt message to the processor component 550 in which it may be specified which of the cores 551 or 552 is to receive that interrupt. The mode controller 345 may direct the interrupt router 555 to route all interrupts received to the lower power core 552, or to route particular interrupts to the lower power core 552 while routing others to the higher function core 551. Regardless of the exact nature of the routing of interrupts by the interrupt router 555 among the cores 551 and 552, in this example embodiment, this interrupt relayed to the processor component 550 by the interrupt router 555 from the NIC 595 is routed by the interrupt router 555 to the lower power core 552.

In response to receiving this particular interrupt from the NIC 595 through the interrupt router 555, the lower power core 552 may use the accompanying identifier of that interrupt to refer to the IDT 235 to obtain the address in the storage 560 of the handler routine associated with that identifier. Again, the IDT 235 may be a table correlating identifiers of interrupts to addresses of handler routines associated with each of those interrupts. As depicted, the handler routine that may be associated with the identifier of this particular interrupt may be a handler routine 1491 making up a portion of the executable instructions of the network device driver 149. Again, the storage 560 may store the network device driver 149 to augment the operating system 340 with the ability to make use of the NIC 595 and/or to add other forms of more general support to the operating system 340 for communications with other devices via a network. Upon retrieving the address within the storage 560 at which at least a portion of the handler routine 1491 is stored, the lower power core 552 may effect a jump to that address to begin executing instructions of the handler routine 1491.

It should be noted that, in some embodiments of the computing device 500, multiple hardware components may share the interrupt identifier associated with interrupts from the NIC 595. Where an electrical conductor is employed to convey interrupts from the NIC 595 to the interrupt router 555, that same electrical conductor may be shared with one or more other hardware components of the computing device 300 that may also use that electrical conductor to convey a hardware interrupt to the interrupt router 555. As a result, the identifier associated with this particular interrupt from the NIC 595 may be correlated to multiple addresses of multiple handler routines, with each of those handler routines being associated with a different hardware component. As a result, although the reception of the hardware interrupt on a particular electrical conductor associated with the particular identifier may narrow down the possible sources of that interrupt to some degree, some form of testing may need to be done to verify that it was the NIC 595 that transmitted an indication of a hardware interrupt on that electrical conductor, and not one or more other hardware components with which the network interface controller 595 may share that electrical conductor. Such testing may entail performing a portion of the instructions making up each of the handler routines associated with each of the multiple hardware components that share that electrical conductor, where each of those portions includes a test to perform.

That test within each of the handler routines may include a read of a register of the associated hardware component at a particular address associated with that hardware component to check a bit value that may indicate whether that component issued a hardware interrupt, or not. Thus, one or more of the registers 5951 of the NIC 595 may be accessible to the lower power core 552 at one or more addresses, and may include at least a single bit that can be read by the lower power core 552 to determine whether or not the NIC 595 transmitted an indication of a hardware interrupt on that electrical conductor that it may share with one or more other hardware components. Thus, and referring briefly back to FIG. 2, the lower power core 552 may begin executing instructions of the handler routine 1491 by executing instructions that perform such a test concerning the NIC 595 such that the lower power core 552 is caused to access at least one of the one or more registers 5951 to confirm that it was the NIC 595 that issued the hardware interrupt via that electrical conductor.

Turning to FIG. 3B, upon confirming that the NIC 595 issued the hardware interrupt, the lower power core 552 may continue executing instructions of the handler routine 1491, thereby causing the lower power core 552 to access the network packet buffer 169 to examine the headers of the one or more received packets to determine what flow of execution is destination of the contents of each of those packets within the computing device 500. More specifically, executing the operating system 340 and/or each of the one or more application routines 740 may entail executing instructions in one or more flows of execution that are associated with the operating system 340 and/or with each of the one or more application routines 740. At least the ones of those flows of execution that may be involved in communications between the computing device 500 and one or more other computing devices via a network may be assigned an identifier and those identifiers may be listed within the flow table 269.

If a flow of execution that is assigned such an identifier transmits a request for data or other response to another device via a network, the identifier of that flow of execution may be included in that request. As a result, if one or more packets conveying the data 39 are received by the NIC 595 in response to a request transmitted from the computing device 500, then the headers of those one or more packets may include an indication of the identifier of the flow of execution within the computing device 500 that made that request. Thus, as part of determining the destination to which to direct the contents of the one or more received packets, the lower power core 552 may retrieve an indication of such an identifier from the header(s) of the one or more packets. The lower power core 552 may then use those identifiers to retrieve an indication of which flow of execution is the destination to which the contents of the packets are to be directed from the flow table 269. The flow table 269 may correlate identifiers of flows of execution to the flows of execution to which those identifiers are assigned. In this example embodiment, the flow of execution identified as the destination for at least a subset of the packets stored within the network packet buffer 169 may be a flow of execution of one of the application routines 740.

As the lower power core 552 is caused by its execution of instructions of the handler routine 1491 to retrieve identifiers of flows of execution from headers and to identify one or more flows of execution to which the data of one or more of the receive packets may be directed, the lower power core 552 may construct a queue (e.g., a linked list) of pointers to the packets so associated with each flow of execution that is a destination for at least one of the packets stored within the network packet buffer 169. The lower power core 552 may, for each flow of execution identified as a destination for data in one or more of the packets, store such a queue within the network queue buffer 369. Thus, for the packets conveying the data 39 from the remote device 90 to the NIC 595, the lower power core may generate a queue of pointers to the packets within the network packet buffer 169 that each convey a portion of the data 39, along with an indication of which flow of execution is the destination of the data 39.

As the lower power core 552 performs such retrieval of identifier(s) and/or generates one or more of such queues of pointers, the NIC 595 may continue to receive more packets conveying more of the data 39 from the remote device 90 via the network 999. In some embodiments, the network interface controller 595 may issue a new hardware interrupt each time another such packet is received, which may result in frequent repetition of the earlier described manner in which execution of the handler routine 1491 is caused to begin. As recognizable to those skilled in the art, this may be deemed to be undesirable, as it may cause the handling of the receipt of packets that is already underway to be repeatedly interrupted by more hardware interrupts that are each also meant to cause handling of the receipt of packets. To address this, in some embodiments, as the lower power core 552 examines packet header(s) and/or extracts identifiers of destinations from one or more packets, the lower power core 552 may be caused by its execution of the instructions of the handler routine 1491 to at least temporarily disable the ability of the NIC 595 to issue more of such interrupts. This may entail the lower power core 552 being caused to write a value to one or more bits of one or more registers 5951 of the NIC 595 to at least temporarily disable the transmission of hardware interrupts therefrom. However, to ensure that the receipt of more packets is not ignored during execution of the handler routine 1491, the lower power core 552 may be further caused to engage in recurring polling of the network packet buffer 169 and/or one or more registers 5951 of the NIC 595 for an indication of more packets having been received. In response to the receipt of further packets while analysis of header(s) and/or generation of queue(s) of pointers is performed, these such activities may be extended to those further received packets. Upon completion of examining packet header(s) and/or generating queues of pointers to all of the packets currently within the network packet buffer 169, and/or upon completion of execution of the handler routine 1491, the lower power core 552 may again access one or more of the registers 5951 of the network interface controller 595 to re-enable the ability of the NIC 595 to transmit interrupts to the interrupt router 555. Again, such toggling between the use of interrupts and polling to detect the arrival of network packets may be referred to as "semi-polling."

As already noted, the data 39 may be received by the NIC 595 in one or more packets. As recognizable to those skilled in the art, the network 999 may employ any of a number of network protocols in which data (e.g., the data 39) and/or instructions transmitted therethrough are first broken up into smaller pieces of data that may each be transmitted through the network within a separate packet. Further, in the breaking up of the data 39, the order in which those smaller pieces of the data 39 must be combined to recreate the data 39 may be indicated in the headers of those packets such that the packets received by the network interface controller 595 may include an indication in their headers of the order in which the pieces of the data 39 must be combined to recreate the data 39 within the computing device 500. Such an indication of order among those packets may be necessary since the order in which the packets are transmitted by the remote device 90 may not be the order in which they are received by the NIC 595. As recognizable to those skilled in the art, each of the packets conveying a piece of the data 39 may take a different path through the network 999 such that different ones of the packets may take different amounts of time to arrive at the NIC 595. Thus, the packets may be received out of the order in which their contents are to be combined to recreate the data 39 and may therefore be stored within the network packet buffer 169 similarly out of order.

In various embodiments, the network packet buffer 169 may be made up of storage locations incorporated into the network interface controller 595, itself, or may be defined among storage locations within the storage 560. Thus, in accessing the received packets, the lower power core 552 may be accessing either a portion of the NIC 595 or a portion of the storage 560. Regardless of the exact manner in which the network packet buffer 169 is implemented, the network packet buffer 169 may have relatively limited capacity to store packets. In some embodiments, if the network packet buffer 169 is allowed to become full such that no more packets may be stored therein, the NIC 595 may refuse to accept more packets from other devices via the network 999 using a protocol that causes retransmission of those refused packets by those other devices as a mechanism to obtain more time for examination of headers and extraction of contents of the packets already stored within the network packet buffer 169 such that those packets may be cleared and/or overwritten. Thus, the execution of the handler routine 1491 at least to the extent of performing such examination of headers of one or more packets stored within the network packet buffer 169 may be a time-sensitive task such that it may be deemed appropriate to employ the use of interrupts to cause the execution of at least a portion of the handler routine 1491 to occur more quickly.

In generating each of the queues of pointers, the lower power core 552 may attempt to organize the manner in which the pointers to packets are listed in each queue to follow indications of order among those packets found in their headers. Thus, the lower power core 552 may attempt to list the packets conveying pieces of the data 39 in a queue in the order in which the pieces of data conveyed in each would have to be reassembled to recreate the data 39. However, in other embodiments, the lower power core 552 may make no such attempt to organize the listing of packets within each queue for each destination flow of execution. Upon receipt of a quantity of the packets conveying the data 39 and the generation and storage of the queue listing those packets in the network queue buffer 369, the lower power core 552 may signal the higher function core 551 with an indication that multiple packets have been received from the network 999 and have been stored within the network packet buffer 169 such that the higher function core 551 is to perform copy operations to copy the contents of multiple packets to buffers associated with one or more flows that have been identified as the destination(s) of those contents. Such an indication to the higher function core 551 may also include an indication of the address of the network packet buffer 169 and/or the network queue 369.

Any of a variety of mechanisms may be used by the lower power core 552 to convey such an indication to the higher function core 551. The lower power core 552 may convey a core-to-core interrupt to the higher function core 551 via the core-to-core interconnect 553. However, it may be deemed preferable to for the lower power core 552 to transmit a message or other indication to the higher function core 551 that does not require that the higher function core 551 cease executing instructions of a current flow of execution to begin another flow of execution to perform such copy operations as part of handling the interrupt originally received from the NIC 595 by the lower power core 552. Instead, it may be deemed preferable for the higher function core 551 to be allowed to schedule a flow of execution for performing such copy operations among the other flows of execution of the operating system 340 and/or of the one or more application routines 740.

As still another alternative, it may be that the lower power core 552 does not provide any such direct indication to the higher function core 551 of their being multiple packets from which the content needs to be copied to destination flow(s) of execution. Instead, the higher function core 551 may already be caused by the operating system 340 to check the network queue buffer 369 on a scheduled recurring basis for an indication of one or more queues having been prepared that the higher function core 551 may use in performing such copy operations. In response to locating one or more of such queues listing a quantity of packets of sufficient number to meet a threshold for performing such copy operations, the higher function core 551 may schedule such copying of the contents of those packets to their destination flow(s) of execution.

Avoiding the use of an interrupt to so inform the higher function core 551 and allowing the higher function core 551 to schedule its execution of instructions associated with handling the interrupt from the NIC 595 may be deemed to make more efficient use of various features of the higher function core 551. Stated differently, the lower power core 552 and the higher function core 551 may be caused to cooperate in responding to the interrupt from the NIC 595 in such a way that the lower power core 552, which is more efficient at directly handing an interrupt, does so to perform one or more time-sensitive tasks associated with handling the interrupt, while the higher function core 551 is allowed to schedule the execution of other tasks associated with handling the interrupt that may not be time-sensitive or may not be as time-sensitive.

Regardless of the exact manner in which the higher function core 551 is made aware of at least a portion of the data 39 having been received in packets stored within the network packet buffer 169 along with an indication of the identity of its destination flow of execution in the network queue 369, once made so aware, the higher function core 551 may execute instructions of a data transfer component 341 to perform the copy operation(s). Turning to FIG. 3C, in so executing the data transfer component 341, the higher function core 551 may be caused to copy pieces of the data 39 from the one or more packets stored in the network packet buffer 169 that conveyed the data 39 and that are listed in a queue of the network queue 369 that includes those packets. The higher function core 551, in performing such copy operations, may copy those pieces of the data 39 to the application data buffer 730 associated with the one of the application routines 740 that includes the flow of execution indicated in the queue as the destination for the data 39. In so doing, and as depicted, such copying of at least a portion of the data 39 by the higher function core 551 in executing the data transfer component 341 may entail making use of what may be higher permissions of the data transfer component 341 within the system context 360 to modify the contents of one of the user contexts 760 that includes that application data buffer 730.

FIGS. 4A-4E, together, depict an example embodiment of cooperation between the cores 551 and 552 of the processor component 550 in handling a pair of interrupts (an indication of a page fault from within the processor component 550 and a hardware interrupt from the storage interface controller 565) arising from a page fault during the execution of one of the application routines 740. Again, as used herein, the term "interrupt" refers to hardware interrupts originating from hardware components other than the processor component 550 and exceptions originating within the processor component 550, including page faults. As recognizable to those skilled in the art, in a computing device in which a virtual memory scheme is employed, pages of data and/or executable instructions are exchanged between higher speed volatile storage and lower speed non-volatile storage based on the frequency with which the contents of each of those pages are used and/or how recently those contents were used. Thus, instances may arise in which data and/or instructions within a page that has been transferred from higher speed volatile storage (e.g., a portion of the storage 560) to lower speed non-volatile storage (e.g., the storage device 60) may be need to be executed as part of executing a routine (e.g., one of the application routines 740), but such execution cannot occur until that page of data and/or instructions is transferred back to the higher speed volatile storage. This situation may be referred to as a page fault, and may result in an interruption of a current flow of execution to cause that transfer back to higher speed volatile storage to occur. As will now be explained, the cores 551 and 552 of the processor component 550 may cooperate to execute different sets of instructions to cooperate in handling both interrupts in a manner that efficiently minimizes disruptions to the execution of instructions of the operating system 340 and/or one or more others of the application routines 740.

Figure 4A:
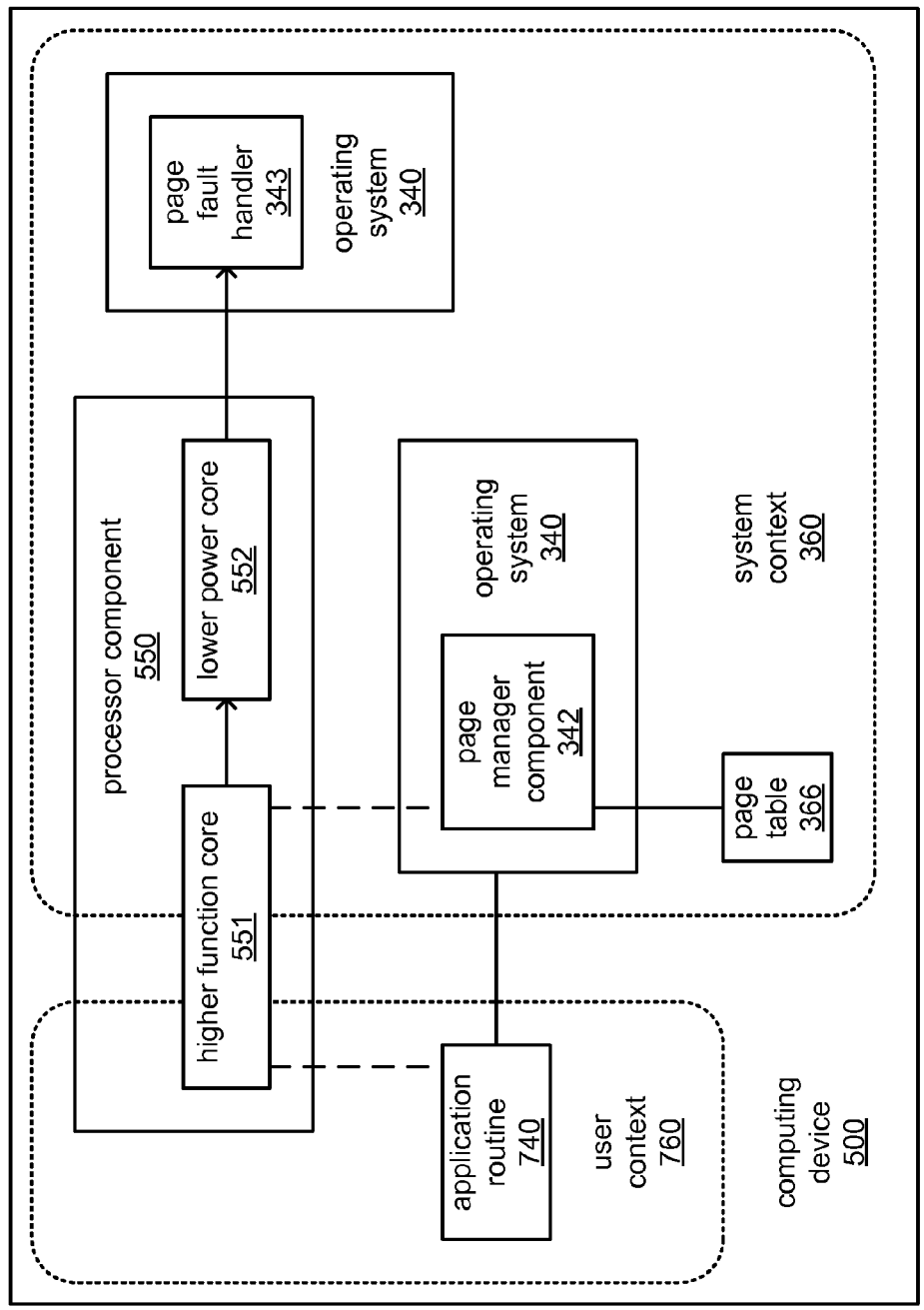
FIGS. 4A, 4B, 4C, 4D and 4E, together, illustrate example embodiment of handling a page fault and a hardware interrupt associated with receiving a page from a storage device.

Turning to FIG. 4A, the higher function core 551 may be engaged in executing one of the application routines 740 within its associated one of the user contexts 760 defined within the storage 560. However, in so doing, a portion of the instructions of that application routine 740 are reached that are within a page that is not currently stored within the storage 560 and/or data is needed from a page that is not currently stored within the storage 560, but instead was earlier transferred to the storage device 60. This may be determined to be the case by the higher function core 551 during its execution of a page manager component 342 of the operating system 340 as an attempt is made to retrieve the data and/or instructions of that page by referring to the page table 366 to correlate the virtual address of that page to a physical address for that page within the storage 560, and discovering that there currently is no such physical address for that page within the storage 560. In response, the higher function core 551 may signal the lower power core 552 with an indication of the page fault (e.g., the first interrupt of the pair of interrupts). In response to receiving this indication of the page fault, the lower power core 552 may begin execution of a page fault handler routine 343 making up a portion of the executable instructions of the operating system 340.

Figure 4B:
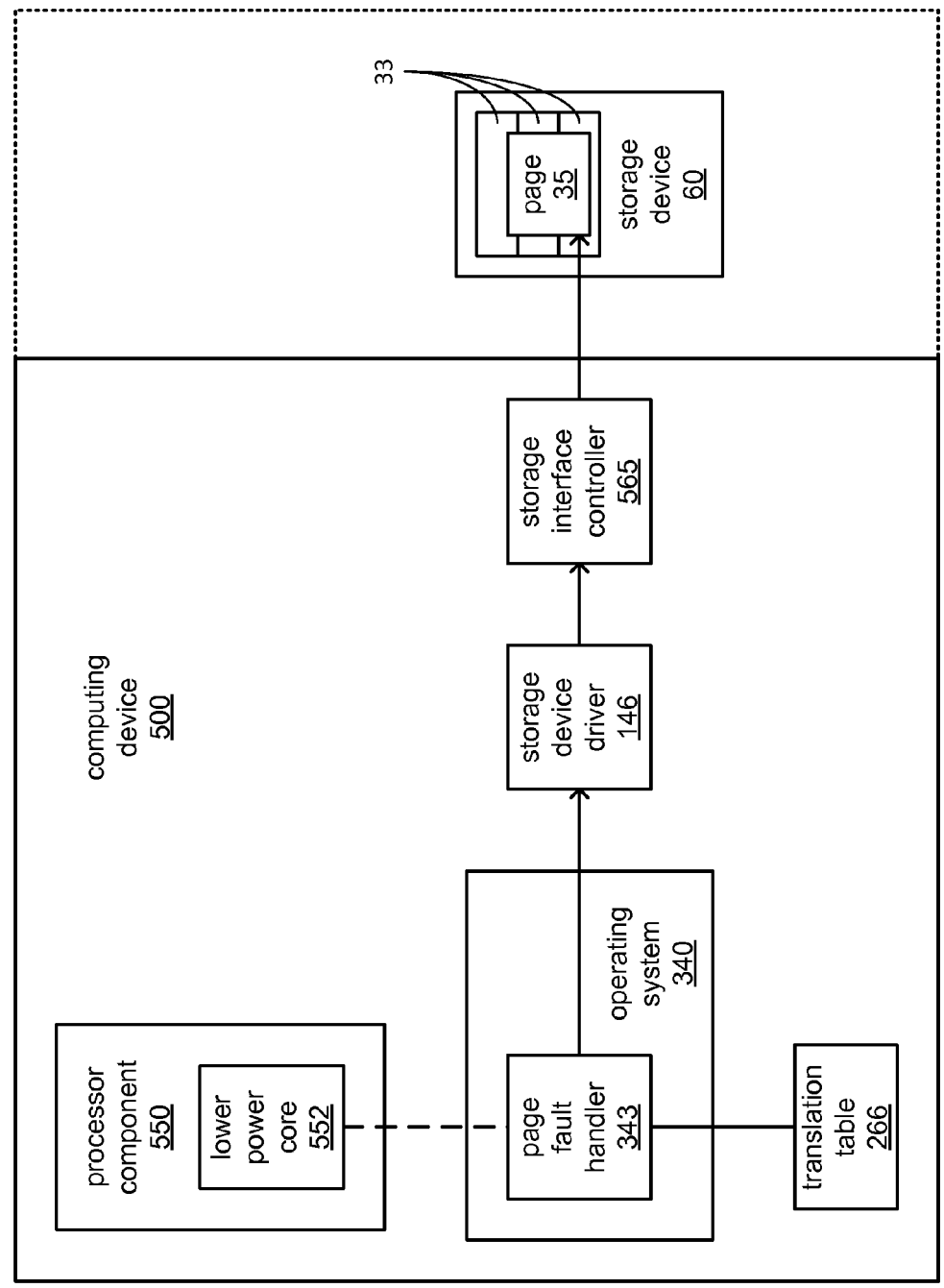

Turning to FIG. 4B, in beginning execution of the instructions of the page fault handler routine 343, the lower power core 552 may refer to the translation table 266 to correlate the virtual address of the page to one or more identifiers of the one or more blocks of data within the storage device 60 that may include the contents of that page. As depicted, the page (designated as the page 35) may be have been earlier stored within the storage device 60 within multiple blocks 33. However, as recognizable to those skilled in the art, whether the page 35 occupies one or more of the blocks 33 may depend at least on the relative sizes (e.g., in bits or bytes) of the page 35 and each of the blocks 33 in various embodiments. Therefore, this depiction of the page 35 as occupying at least a portion of more than one block 33 should not be taken as limiting. With the identifier(s) of the one or more blocks 33 associated with the page 35 having been retrieved from the translation table 266, the lower power core 552, in continuing to execute instructions of the page fault handler routine 343, may convey a request to the storage interface controller 565 through the storage device driver 146 that the page 35 be retrieved from the one or more blocks 33 within which it is stored in the storage device 60. In response, the storage interface controller 565 may request the contents of the one or more blocks 33 from the storage device 60. It should be noted that although the storage interface controller 565 and the storage device 60 are depicted as separate components, other embodiments are possible in which one is integrated into the other.

Figure 4C:
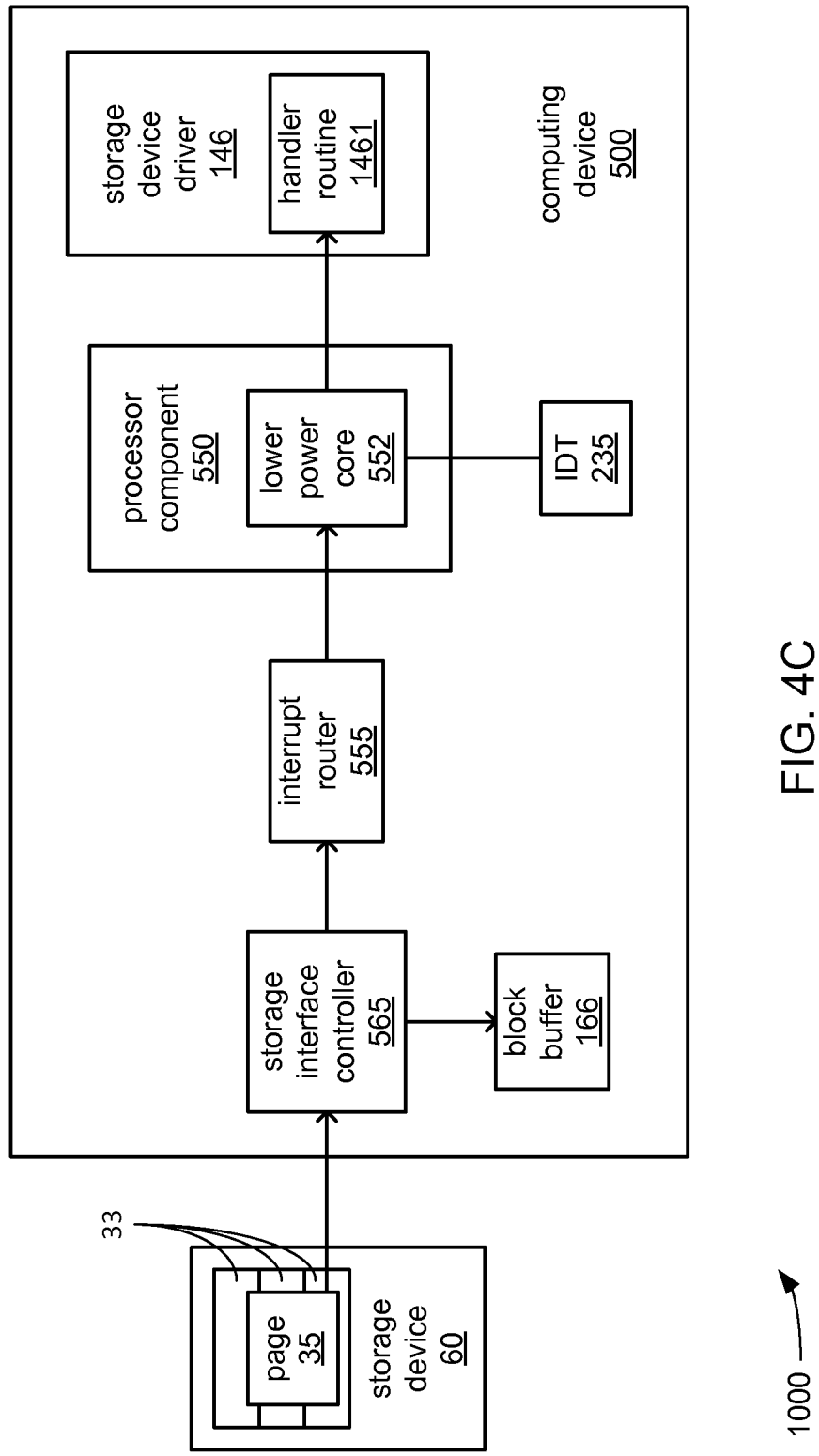

Turning to FIG. 4C, the storage interface controller 565 may receive the contents of the one or more blocks 33 from the storage device 60. In response to the receipt of the one or more blocks 33, the storage interface controller 565 may store the contents of those blocks within the block buffer 166, and may issue a hardware interrupt that may be received by the interrupt router 555, and may be relayed to the processor component 550 along with an indicator of an identifier of the interrupt. Presuming that the mode controller 345 has been configured such that this interrupt is routed to the lower power core 552, the lower power core 552 may respond to the receipt of this hardware interrupt by using the accompanying identifier of that interrupt to refer to the IDT 235 to obtain the address in the storage 560 of the handler routine associated with the identifier. Again, the IDT 235 may be a table correlating identifiers of interrupts to addresses of handler routine(s) associated with each of those interrupts. As depicted, the handler routine that may be associated with the identifier of this particular hardware interrupt may be a handler routine 1461 making up a portion of the executable instructions of the storage device driver 146. Upon retrieving the address within the storage 560 at which at least a portion of the handler routine 1461 is stored, the lower power core 552 may effect a jump to that address to begin executing instructions of the handler routine 1461.

However, once again, it may be that multiple hardware components share the same electrical conductor as the storage interface controller 565 for transmitting an interrupt to the interrupt router 555. As a result of this or another circumstance, the particular identifier associated with this hardware interrupt may be correlated to multiple addresses of multiple handler routines, with each of those handler routines being associated with a different hardware component, and some form of testing may need to be done to verify that it was the storage interface controller 565 that issued this particular interrupt. Again, such testing may entail performing a portion of the instructions making up each of one or more handler routines, and to enable such testing by the handler routine 1461, one or more of the registers 5651 of the storage controller 565 may be reachable by the lower power core 552 at one or more addresses to determine whether or not it was the storage interface controller 565 that originated this hardware interrupt.

Figure 4D:
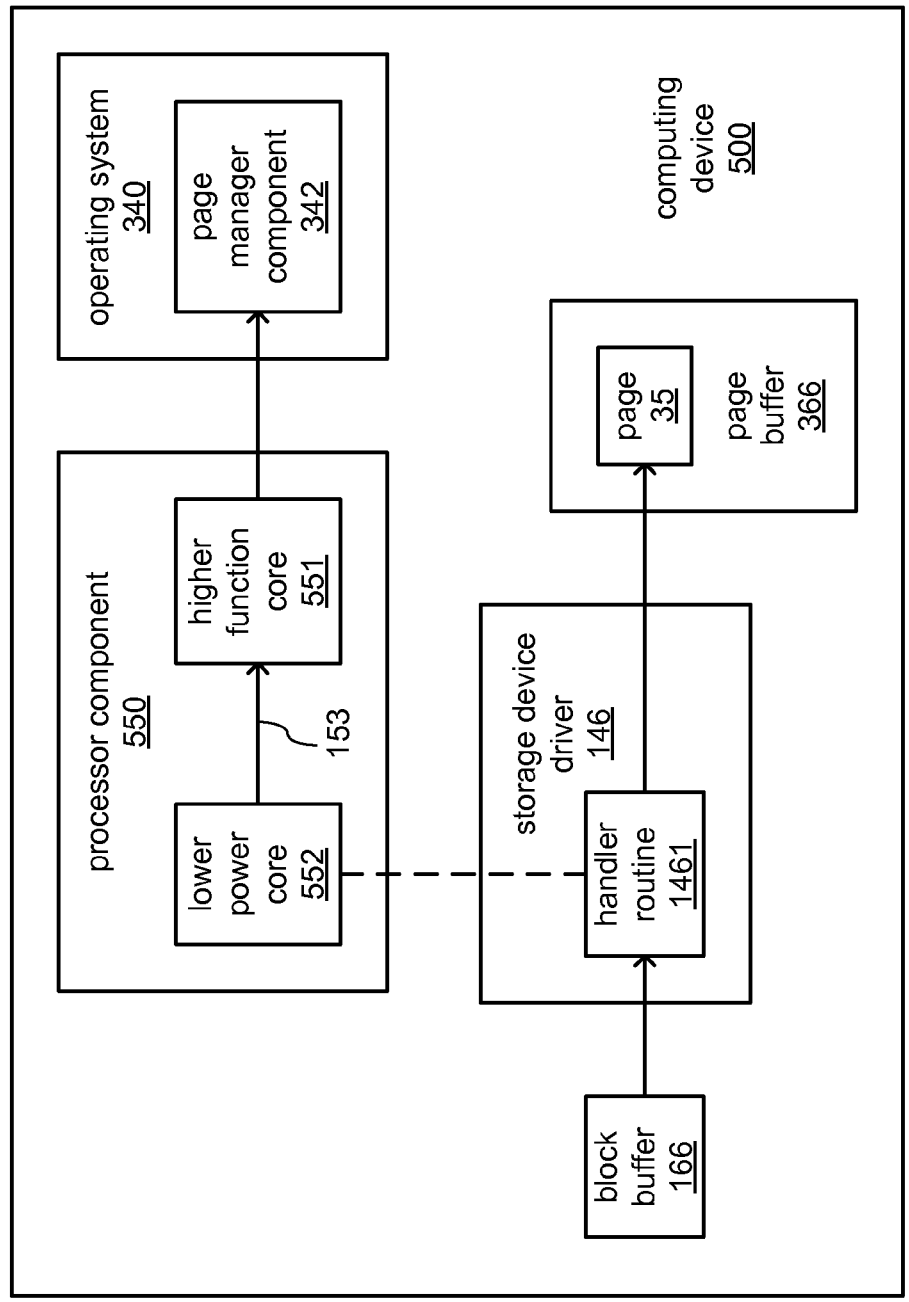

Thus, and turning to FIG. 4D, the lower power core 552 may begin executing instructions of the handler routine 1461 by executing instructions that perform such a test concerning the storage interface controller 565 such that the lower power core 552 is caused to access at least one of the one or more registers 5651 to confirm that it was the storage interface controller 565 that issued the hardware interrupt. Upon confirming that the storage interface controller 565 issued the hardware interrupt, the lower power core 552 may continue executing instructions of the handler routine 1461, thereby causing the lower power core 552 to access the block buffer 166 to retrieve the page 35 from the one or more blocks 33 stored therein, and may store the page 35 within the page buffer 366.

As recognizable to those skilled in the art, various circumstances may lead to the one or more blocks 33 being distributed within the storage device 60 in a non-contiguous manner. Further, at the time the storage device 60 receives the request from the storage interface controller 565 to provide the one or more blocks 33 thereto, factors such as current positions of magnetic heads relative to platters and/or which bank of solid state storage components is currently being accessed within the storage device 60 may lead to the retrieval and provision of the one or more blocks 33 to the storage interface controller in a manner that is out of order for how their contents would need to be combined to recreate the page 35. Thus, the lower power core 552 may retrieve non-contiguous portions of the page 35 from the block buffer 166 as non-contiguous ones of the blocks 33 are received by and stored within the block buffer 166 by the storage interface controller 565. Further, the block buffer 166 may be of limited capacity such that the retrieval of portions of the page 35 from the blocks 33 stored therein may be a time-sensitive task such that the use of a hardware interrupt to signal the receipt of the one or more blocks 33 may be deemed appropriate.

In retrieving portions of the page 35 from the block buffer 166 and storing those portions within the page buffer 366, the lower power core 552 may combine the portions of the page 35 in their proper order to recreate the page 35. Following such recreation of the page 35 within the page buffer 366, the lower power core 552 may next take various different actions in different embodiments.

In some embodiments, completion of the handling of the page fault may include the higher function core 551 copying the page 35 from the page buffer 366 in the system context 360 and into the user context 760 in which the application routine 740 is being executed in the flow of execution that lead to the need to retrieve the page 35. In some of such embodiments, the lower power core may signal the higher function core 551 with an indication that the page 35 has been stored within the page buffer 366. Again, any of a variety of mechanisms may be used by the lower power core 552 to convey such an indication to the higher function core 551. Also, once again, as still another alternative, there may be no such indication provided by the lower power core 552 to the higher function core 551, at all, and the higher function core 551 may become aware of at least a portion of the page 35 having been stored within the page buffer 366 by recurring polling of the page buffer 366. It may still be deemed desirable to at least the avoid the use of a form of interrupt between the cores 551 and 552 that results in an interruption to the current flow of execution of instructions by the higher function core 551 in favor of allowing the higher function core 551 to schedule its response to the storing of the page 35 within the page buffer 366 among its other normally scheduled flows of execution.

Figure 4E:
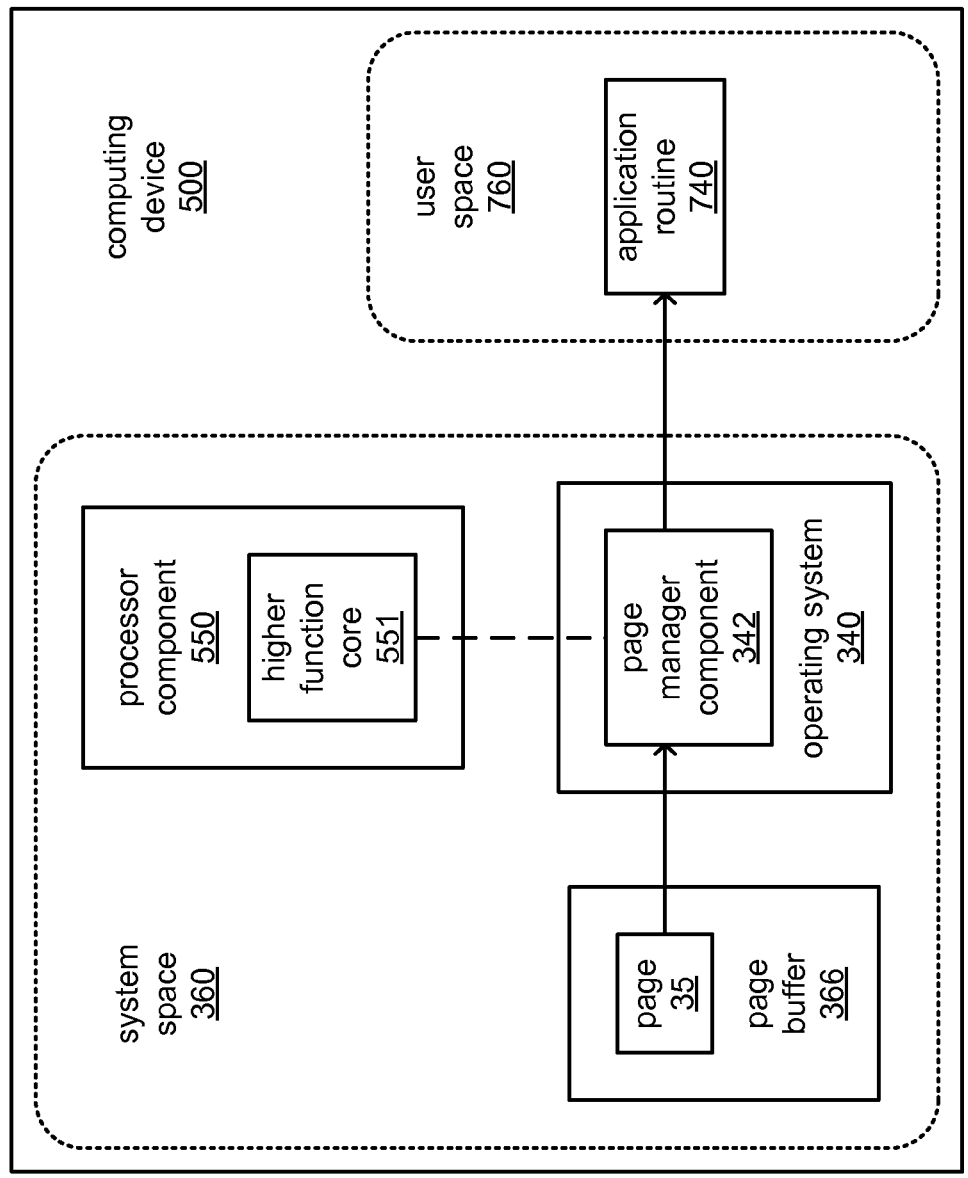

Regardless of the exact manner in which the higher function core 551 is made aware of at least a portion of the page 35 having been stored within the page buffer 366, once made so aware, the higher function core 551 may execute instructions of the page manager component 342 in response. Turning to FIG. 4E, in so executing the page manager component 342, the higher function core 551 may be caused to copy the page 35 from the page buffer 366 inside the system context 360 and to a series of storage locations within the storage 560 that may be assigned to be part of the user context 760 in which the application routine 740 is being executed by the higher function core 551 to provide the next instructions of that application routine 740 that were found to not be available for execution and/or the data needed by the application routine 740 that was found to not be available to thereby enable such execution to continue.

However, in other embodiments, completion of the handling of the page fault may include either of the lower function core 552 or the higher function core 551 remapping the storage locations of the storage 560 that provide the portion of the page buffer 366 currently occupied by the page 35 from the system context 360 and into the user context 760 in which the application routine 740 is being executed. Stated differently, instead of copying the page 35 from one portion of the storage 560 to another to transfer the page 35 from one context to another, the portion of the storage 560 already occupied by the page 35 may simply be remapped from one context to another. Where the lower power core 552 performs this remapping, it may do so as part of executing instructions of the page fault handler 343, which may receive the indication of the page 35 having been stored in the page buffer 366 such that it is available to be so remapped. Following such remapping, the lower power core 552 may signal the higher function core 551 concerning such remapping to enable the higher function core 551 to return to executing instructions of the page manager component 342 to cause loading of instructions and/or data of the page 35 to provide the next instructions of the application routine 740 and/or that data to the higher function core 551 for execution. However, where the higher function core 551 performs this remapping, it may do so as part of executing the page manager component 342, the lower power core 552 may signal the higher function core 551 once the page 35 is stored within the page buffer 366 to enable the higher function core 551 to execute instructions of the page manager component 342 to perform such remapping.

In various embodiments, the storage 560 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the network interface controller 595 may implement an interface to the network 999 that may employ any of a wide variety of signaling technologies enabling these computing devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 5:
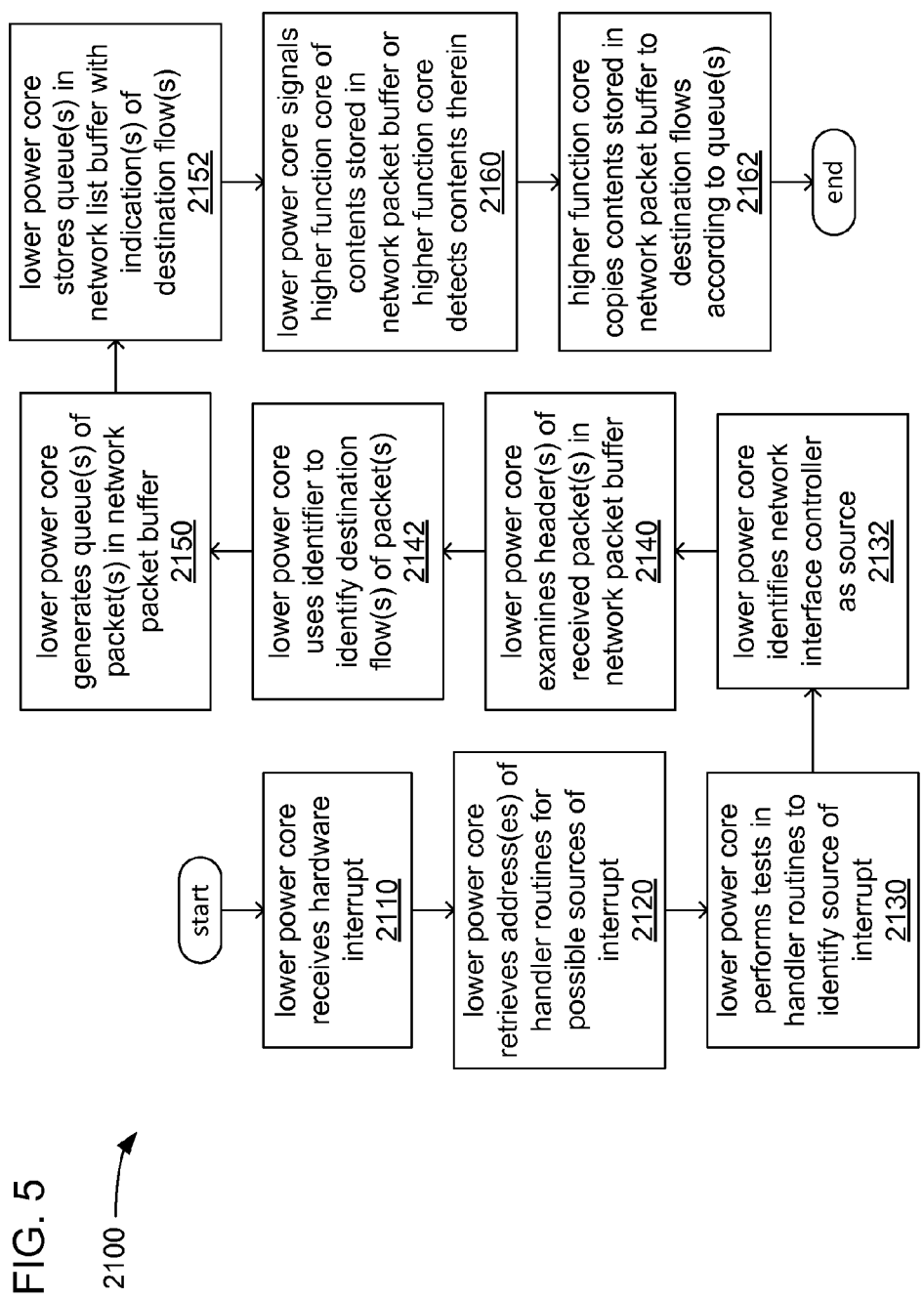
FIGS. 5 and 6 each illustrate a logic flow according to an embodiment.

FIG. 5 illustrates one embodiment of a logic flow 2100. The logic flow 2100 may be representative of some or all of the operations executed by one or more embodiments described herein. More specifically, the logic flow 2100 may illustrate operations performed by the processor component 550 in executing at least a portion of the operating system 340 and/or one or more device drivers, and/or performed by other component(s) of the computing device 500.

At 2110, a lower power core of a processor component of a computing device (e.g., the lower power core 552 of the processor component 550 of the computing device 500) may receive an interrupt originating from a hardware component of the computing device. Again, as used herein, the term "interrupt" includes hardware interrupts generated by hardware components outside a processor component and exceptions generated by internal logic of the processor component, including page faults. In this case, the interrupt is a hardware interrupt. As previously discussed, an operating system may include a mode controller that may dynamically determine which of the lower power core or a higher function core (e.g., the mode controller 345 and the higher function core 551) to route one or more hardware interrupts to, and may direct an interrupt router (e.g., the interrupt router 555) to do so.

At 2120, the lower power core may use an identifier of the received interrupt to retrieve one or more addresses of one or more ISRs associated with what may be one or more possible sources of the hardware interrupt. As previously discussed, in some computing devices, multiple hardware components may share the use of a single electrical conductor along which to transmit an indication of a hardware interrupt such that the source of the hardware interrupt may need to be identified.

At 2130, the lower power core may, in embodiments in which there may be ambiguity as to the source of an interrupt, execute a subset of the instructions of each of the one or more handler routines that cause the lower power core to perform test(s) to determine whether the hardware component associated with each of those handler routines is the source of this hardware interrupt. At 2132, the performance of such test(s) result in the lower power core identifying a network interface controller (NIC) of the computing device that has received one or more packets from a network as the source of the hardware interrupt received by the lower power core (e.g., the NIC 595).

At 2140, the lower power core examines the header(s) of the received packet(s) within a packet buffer into which the network interface controller has stored the received packet(s). More specifically, and as previously discussed, the lower power core may retrieve one or more pieces of information from those header(s), including an identifier of a flow of execution that is the intended destination of contents of each packet (e.g., the data and/or instructions being conveyed). At 2142, the lower power core may employ the retrieved identifier(s) to identify the destination flow of execution as being part of the execution of a routine within the computing device (e.g., a flow of execution belonging to a portion of the operating system 340 or an application routine 740 that may be executed by either of the lower power core or the higher function core). Again, to so identify the destination flow of execution, the lower power core may use a table of such identifiers to correlate the identifier with the destination flow of execution.

At 2150, the lower power core may generate, for each flow of execution identified as a destination of the contents of one or more of the packets, a queue of pointers to the packets indicated by their identifiers as intended for that flow of execution. The lower power core may then store the one or more queues that are so generated within a network queue buffer along with an indication for each queue of the associated destination flow of execution at 2152. As previously discussed, the examination of header(s) and/or the generation of queue(s) stored in the network queue buffer to enable the contents of the received packets to be retrieved from the packets and provided to their destination flow(s) of execution may be time-sensitive tasks since there may be no way to control when the next packet will be received.

At 2160, the lower power core may signal the higher function core with an indication of at least a portion of data and/or instructions conveyed in one or more pieces among one or more packets being stored within the network data buffer along with an indication of where to retrieve the queue of pointers to those packets and/or an indication of the destination flow of execution. Alternatively, and has been discussed, the lower power core may provide no such indication to the higher function core, at all, and instead, the higher function core may detect the storing of a queue listing a quantity of packets that meet a threshold within the network queue buffer. At 2162, the higher function core may then employ its more efficient ability to copy data to follow the listing of packets in that queue to copy the portion (or entirety) of the data and/or instructions stored within the listed packets from the network packet buffer to a location within a user context or a system context where it can be accessed by the destination flow of execution.

Figure 6:
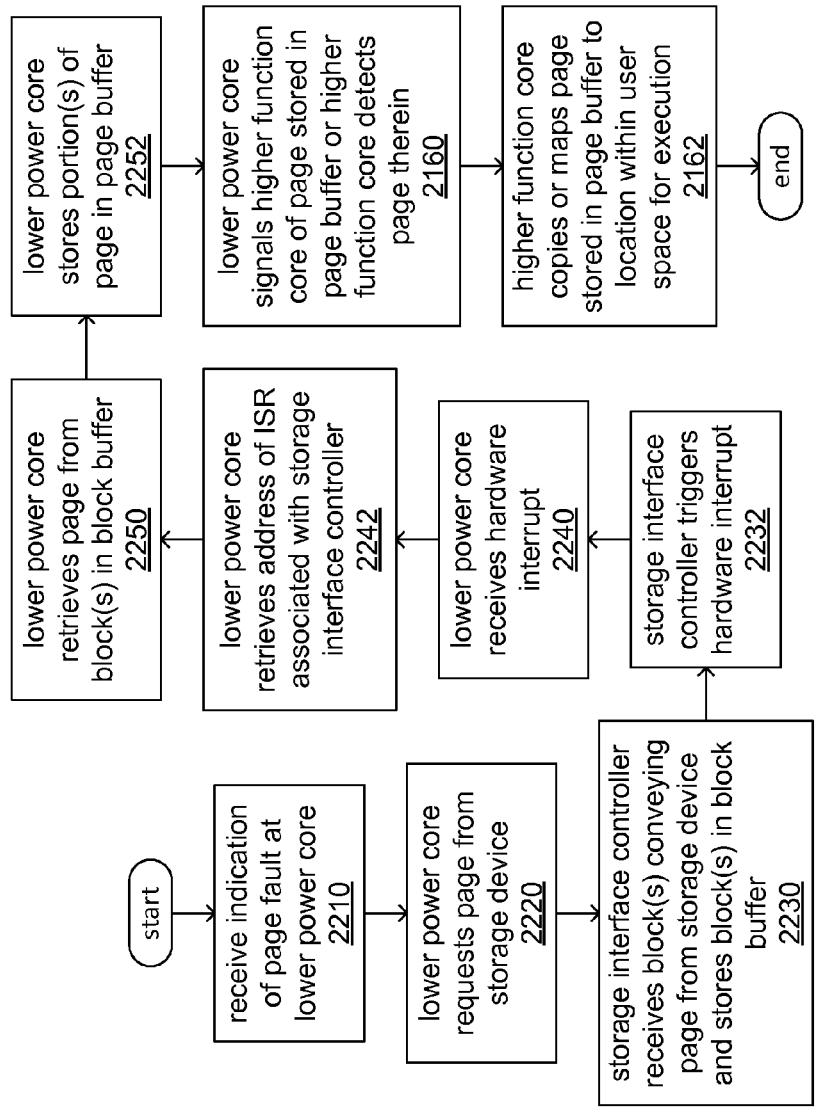

FIG. 6 illustrates one embodiment of a logic flow 2200. The logic flow 2200 may be representative of some or all of the operations executed by one or more embodiments described herein. More specifically, the logic flow 2200 may illustrate operations performed by the processor component 550 in executing at least a portion of the operating system 340, an application routine 740 and/or one or more device drivers, and/or performed by other component(s) of the computing device 500.

At 2210, a lower power core of a processor component of a computing device (e.g., the lower power core 552 of the processor component 550 of the computing device 500) may receive an interrupt arising from the occurrence of a page fault during execution of instructions of an application routine (e.g., one of the one or more application routines 740) by a higher function core of the processor component (e.g., higher function core 551). As previously discussed, as part of both the lower power core and the higher function core of the processor component being operated to execute instructions, page faults generated by internal logic of the higher function core may be directed to the lower function core to handle at least the more time-sensitive aspects of.

At 2220, the lower power core may request the needed page from a storage device under the control of a storage interface controller of the computing device (e.g., the storage device 60 and the storage interface controller 565). As previously discussed, in making the request to the storage interface controller 565, the lower power core may request retrieval of the one or more blocks within the storage device that include the page (e.g., the one or more blocks 33 and the page 35) using identifiers of the blocks correlated by the lower power core to the virtual address of the page with a translation table.

At 2230, the storage interface controller may receive the one or more blocks within which the page may be stored and may store those block(s) as the storage interface controller receives them in a block buffer. At 2232, the storage interface controller may transmit a hardware interrupt to the processor component to cause action to be taken with respect to the blocks now occupying what may be limited space within the block buffer. As previously discussed, this hardware interrupt becomes the second interrupt associated with the occurrence of a page fault, the first being the indication of the page fault itself from the higher function core to the lower power core. As also previously discussed, the retrieval of data and/or instructions from among blocks stored within the block buffer may be a time-sensitive task since the storage interface controller may soon need to receive and store more blocks from the storage device.

At 2240, the lower power core may receive the hardware interrupt originated by the storage interface controller. At 2242, the lower power core may uses an identifier of the received hardware interrupt to retrieve an address of the handler routine associated with the storage interface controller. However, again, there may be a need to perform tests to determine what hardware component of the computing device originated this hardware interrupt. As a result, again, multiple addresses for multiple handler routines may be retrieved from an IDT based on the identifier associated with the hardware interrupt, and instructions of one or more of these handler routines to implement one or more of such tests may need to be executed by the lower power core to determine the source of this hardware interrupt (in this example, the storage interface controller).

At 2250, the lower power core may retrieve the pieces of the needed page from within the one or more blocks that have been so far received and stored within the block buffer, and then may store those piece(s) within a page buffer at 2252. As previously discussed, the lower power core may attempt to reassemble that page as it stores the pieces of the page within the page buffer.

At 2260, the lower power core may signal the higher function core with an indication of the page being stored within the page buffer. Alternatively, and has been discussed, the lower power core may provide no such indication to the higher function core, at all, and instead, the higher function core may detect the storing of the page within the page buffer itself through recurring polling. At 2262, the higher function core may then employ its more efficient ability to copy data to copy the page stored within the page buffer to a location within a user context that is assigned to the application routine to enable execution of that application to continue. Or, at 2262, the higher function core may then remap the portion of the page buffer occupied by the needed page from the system context in which the page buffer exists and into the user context of the application routine, and may then continue execution of the application routine within that remapped page. However, as still another alternative, it may be the lower power core that performs such remapping, and then the lower power core may signal the higher function core of the page having been so remapped such that it is now available within that user context for its instructions to be executed.

Figure 7:
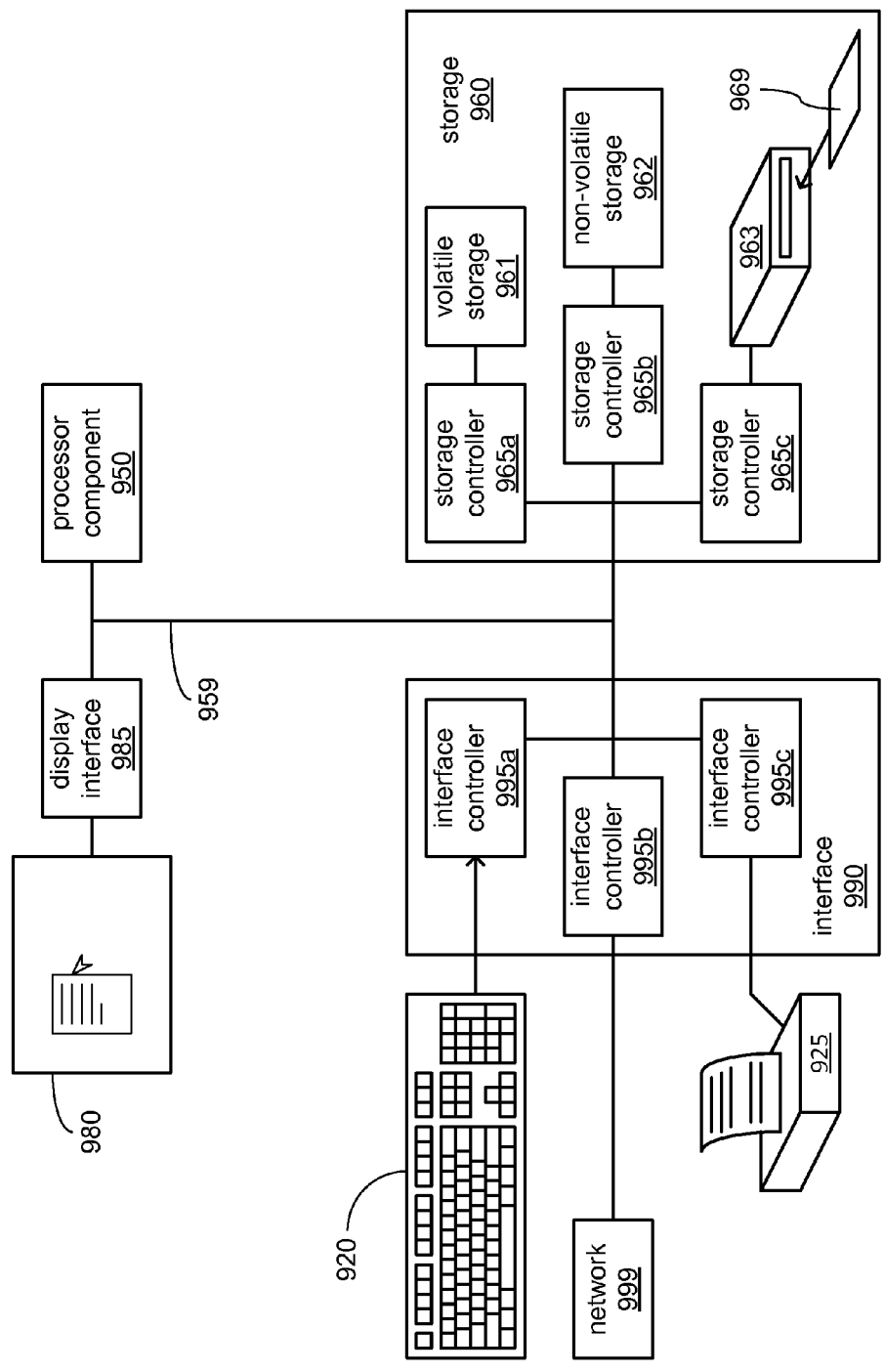
FIG. 7 illustrates a processing architecture according to an embodiment.

FIG. 7 illustrates an embodiment of an exemplary processing architecture 3000 suitable for implementing various embodiments as previously described. More specifically, the processing architecture 3000 (or variants thereof) may be implemented as part of one or more of the computing devices 100, 300, 500 or 700, and/or as part of the controller 600. It should be noted that components of the processing architecture 3000 are given reference numbers in which the last two digits correspond to the last two digits of reference numbers of at least some of the components earlier depicted and described as part of the computing devices 100, 300, 500 and 700, as well as the controller 600. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, a software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device includes at least a processor component 950, a storage 960, an interface 990 to other devices, and a coupling 959. As will be explained, depending on various aspects of a computing device implementing the processing architecture 3000, including its intended use and/or conditions of use, such a computing device may further include additional components, such as without limitation, a display interface 985.

The coupling 959 includes one or more buses, point-to-point interconnects, transceivers, buffers, crosspoint switches, and/or other conductors and/or logic that communicatively couples at least the processor component 950 to the storage 960. Coupling 959 may further couple the processor component 950 to one or more of the interface 990, the audio subsystem 970 and the display interface 985 (depending on which of these and/or other components are also present). With the processor component 950 being so coupled by couplings 959, the processor component 950 is able to perform the various ones of the tasks described at length, above, for whichever one(s) of the aforedescribed computing devices implement the processing architecture 3000. Coupling 959 may be implemented with any of a variety of technologies or combinations of technologies by which signals are optically and/or electrically conveyed. Further, at least portions of couplings 959 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to the processor components 550 and 650) may include any of a wide variety of commercially available processors, employing any of a wide variety of technologies and implemented with one or more cores physically combined in any of a number of ways.

As previously discussed, the storage 960 (corresponding to the storages 560 and 660) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly including multiple distinct types of storage is in recognition of the commonplace use of more than one type of storage device in computing devices in which one type provides relatively rapid reading and writing capabilities enabling more rapid manipulation of data by the processor component 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 959 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 959 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of tangible machine-readable storage medium 969, the removable media storage 963 may be communicatively coupled to coupling 959 through a storage controller 965c providing an appropriate interface to the removable media storage 963 that perhaps employs addressing of blocks of information, and where the storage controller 965c may coordinate read, erase and write operations in a manner specific to extending the lifespan of the tangible machine-readable storage medium 969.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data.

Thus, a routine including a sequence of instructions to be executed by the processor component 950 may initially be stored on the tangible machine-readable storage medium 969, and the removable media storage 963 may be subsequently employed in copying that routine to the non-volatile storage 962 for longer term storage not requiring the continuing presence of the tangible machine-readable storage medium 969 and/or the volatile storage 961 to enable more rapid access by the processor component 950 as that routine is executed.

As previously discussed, the interface 990 (possibly corresponding to the interface 590) may employ any of a variety of signaling technologies corresponding to any of a variety of communications technologies that may be employed to communicatively couple a computing device to one or more other devices. Again, one or both of various forms of wired or wireless signaling may be employed to enable the processor component 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network made up of one or more links, smaller networks, or perhaps the Internet). The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, a microphone to monitor sounds of persons to accept commands and/or data signaled by those persons via voice or other sounds they may make, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a computing device is communicatively coupled to (or perhaps, actually incorporates) a display (e.g., the depicted example display 980), such a computing device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

In Example 1, an apparatus includes a lower power core of a processor component, the lower power core comprising a first instruction pipeline and the lower power core to stop a first flow of execution in the first instruction pipeline and execute instructions of a handler routine in the first instruction pipeline to perform a first task of handling an interrupt; and a higher function core of the processor component, the higher function core comprising a second instruction pipeline and the higher function core to, following the performance of the first task, schedule execution of instructions of a second task of handling the interrupt in the second instruction pipeline to follow a second flow of execution in the second instruction pipeline, the first task more time-sensitive than the second task.

In Example 2, which includes the subject matter of Example 1, the lower power core may consume electric power at a lower rate than the higher function core.

In Example 3, which includes the subject matter of any of Examples 1-2, the second instruction pipeline may include at least one of a greater quantity of stages of instruction execution than the first instruction pipeline or an ability to perform out-of-order execution of instructions not supported by the first instruction pipeline.

In Example 4, which includes the subject matter of any of Examples 1-3, the lower power core may include a first cache, the higher function core comprising a second cache, and the second cache comprising at least one of a greater quantity of cache lines than the first cache or a greater set associativity than the first cache.

In Example 5, which includes the subject matter of any of Examples 1-4, the apparatus may include a mode controller to dynamically place the processor component in one of at least a first mode in which the lower power core and the higher function core are both operated to execute instructions, and a second mode in which the lower power core is operated to execute instructions and the higher function core is not operated to execute instructions, based on a level of demand for resources of the processor component.

In Example 6, which includes the subject matter of any of Examples 1-5, the mode controller may select one of the lower power core and the higher function core to direct the interrupt to based on whether the processor component is placed in the first mode or the second mode.

In Example 7, which includes the subject matter of any of Examples 1-6, the interrupt may include a hardware interrupt, and the apparatus may include an interrupt router coupled to the processor component to relay an indication of receipt of the hardware interrupt by the interrupt router to the one of the lower power core and the higher function core selected by the mode controller.

In Example 8, which includes the subject matter of any of Examples 1-7, the apparatus may include a network packet buffer; a network interface controller (NIC) to couple the processor component to a network and to, in response to receiving a packet from the network, store the packet within the packet buffer and transmit the interrupt to the processor component; and an interrupt router to receive the transmission of the interrupt from the NIC and to relay an indication of receipt of the interrupt to the processor component along with an identifier of the NIC as a source of the interrupt.

In Example 9, which includes the subject matter of any of Examples 1-8, the apparatus may include an interrupt descriptor table (IDT), the lower power core may employ the identifier to retrieve multiple addresses of multiple handler routines from the IDT, the multiple handler routines may include the handler routine, the multiple addresses may include the address of the handler routine, the lower power component may employ each address of the multiple addresses may execute instructions of each handler routine of the multiple handler routines in the first instruction pipeline to identify the NIC as the source of the interrupt.

In Example 10, which includes the subject matter of any of Examples 1-9, the lower power core, in executing instructions of the handler routine in the first instruction pipeline, may retrieve an identifier from each of multiple packets stored within the network packet buffer, and the identifier may indicate a flow of execution to which each packet of the multiple packets is directed.

In Example 11, which includes the subject matter of any of Examples 1-10, the lower power core, in executing instructions of the handler routine in the first instruction pipeline, may generate a queue that lists one or more packets of the multiple packets associated with a destination flow of execution, and may store the queue in a network queue buffer.

In Example 12, which includes the subject matter of any of Examples 1-11, the apparatus may include a data transfer component of an operating system for execution by the higher function core as the second task to retrieve the queue and to copy data from the one or more packets listed in the queue from the network data buffer to an application data buffer of an application routine stored in a user context separately from a system context of the operating system, the application routine comprising the destination flow of execution.

In Example 13, which includes the subject matter of any of Examples 1-12, the apparatus may include a page manager component of an operating system for execution by the higher function core to provide pages of instructions of an application routine in a higher speed storage to the higher function core to execute; and a page fault handler routine for execution by the lower power core in response to a page fault in which a next page of instructions of the application routine to be executed by the higher function core is stored in a slower speed storage device and not stored in the higher speed storage.

In Example 14, which includes the subject matter of any of Examples 1-13, the page fault may be detected by the higher function core as a result of a failure in an attempt by the higher function core to retrieve instructions of the next page from the higher speed storage.

In Example 15, which includes the subject matter of any of Examples 1-14, the apparatus may include a storage interface controller to couple the processor component to the slower speed storage device, and the lower power core may, in executing instructions of the page fault handler routine, request retrieval of the next page from the slower speed storage device.

In Example 16, which includes the subject matter of any of Examples 1-15, the apparatus may include a block buffer; and an interrupt router to receive a transmission of the interrupt from the storage interface controller and to relay an indication of receipt of the interrupt to the processor component along with an identifier of the storage interface controller as the source of the interrupt, the storage interface controller to transmit the interrupt to the interrupt router and to store a block of data in the block buffer in response to receiving the block of data from the slower speed storage device, and the block of data may include a portion of the next page.

In Example 17, which includes the subject matter of any of Examples 1-16, the apparatus may include an interrupt descriptor table (IDT), the lower power core to employ the identifier to retrieve multiple addresses of multiple handler routines from the IDT, the multiple handler routines comprising the handler routine, the multiple addresses comprising the address of the handler routine, the lower power component to employ each address of the multiple addresses to execute instructions of each handler routine of the multiple handler routines in the first instruction pipeline to identify the storage interface controller as the source of the interrupt.

In Example 18, which includes the subject matter of any of Examples 1-17, the lower power core, in executing instructions of the handler routine in the first instruction pipeline, may retrieve multiple pieces of data from multiple blocks stored within the block buffer and to store the multiple blocks of data in a page buffer in an order that recreates the next page, and the multiple blocks of data may include the block of data.

In Example 19, which includes the subject matter of any of Examples 1-18, the page manager to copy the next page from the page buffer to an application data buffer of the application routine stored in a user context separate from a system context of the operating system as the second task following recreation of the next page in the page buffer by the lower power core.

In Example 20, which includes the subject matter of any of Examples 1-19, the page manager may remap the next page from the page buffer within a system context of the operating system to a user context of the application routine as the second task following recreation of the next page in the page buffer by the lower power core.

In Example 21, which includes the subject matter of any of Examples 1-20, the lower power core may remap the next page from the page buffer within a system context of the operating system to a user context of the application routine, and the higher function core may jump to the next page to continue execution of the application routine following remapping of the next page by the lower power core.

In Example 22, a computing-implemented method includes stopping a first flow of execution in a first instruction pipeline of a lower power core of a processor component in response to an interrupt; retrieving, by the lower power core, an address of a handler routine in response to the interrupt; executing instructions of the handler routine in the first instruction pipeline to perform a first task of handling the interrupt; scheduling, by a higher function core of the processor component following performance of the first task by the lower power core, execution of instructions of a second task of the handling of the interrupt in a second instruction pipeline of the higher power core to follow a second flow of execution in the second instruction pipeline, the first task more time-sensitive than the second task.

In Example 23, which includes the subject matter of Example 22, the method may include dynamically placing the processor component in one of at least a first mode in which the lower power core and the higher function core are both operated to execute instructions, and a second mode in which the lower power core is operated to execute instructions and the higher function core is not operated to execute instructions, based on a level of demand for resources of the processor component; and selecting one of the lower power core and the higher function core to direct the interrupt to based on whether the processor component is placed in the first mode or the second mode.

In Example 24, which includes the subject matter of any of Examples 22-23, the method may include receiving, at the lower power core, a transmission of the interrupt from a network interface controller (NIC) that couples the processor component to a network along with an identifier of the NIC as a source of the interrupt, the NIC to transmit the interrupt in response to receiving a packet from the network.

In Example 25, which includes the subject matter of any of Examples 22-24, the method may include using, by the lower power core, the identifier to retrieve multiple addresses of multiple handler routines from an interrupt descriptor table (IDT), where the multiple handler routines may include the handler routine and the multiple addresses may include the address of the handler routine; and executing in the first instruction pipeline, instructions of each handler routine of the multiple handler routines at the multiple addresses to identify the NIC as the source of the interrupt.

In Example 26, which includes the subject matter of any of Examples 22-25, the method may include retrieving, in executing instructions of the handler routine in the first instruction pipeline, an identifier from each of multiple packets stored within the network packet buffer, the identifier may indicate a flow of execution to which each packet of the multiple packets is directed.

In Example 27, which includes the subject matter of any of Examples 22-26, the method may include generating, in executing instructions of the handler routine in the first instruction pipeline, a queue that lists one or more packets of the multiple packets associated with a destination flow of execution; and storing, in executing instructions of the handler routine, the queue in a network queue buffer.

In Example 28, which includes the subject matter of any of Examples 22-27, the method may include retrieving, in executing instructions of the second task in the second instruction pipeline, the queue; and copying, in executing instructions of the second task in the second instruction pipeline, data from the one or more packets listed in the queue from the network data buffer to an application data buffer of an application routine stored in a user context separately from a system context of an operating system, the application routine comprising the destination flow of execution.

In Example 29, which includes the subject matter of any of Examples 22-28, the method may include retrieving, in executing instructions of an application routine in the second instruction pipeline, pages of instructions of the application routine to execute in the second instruction pipeline from a higher speed storage; detecting, in executing instructions of the application routine in the second instruction pipeline, a page fault in which a next page of instructions of the application routine to be executed in the second instruction pipeline is stored in a slower speed storage device and not in the higher speed storage; and requesting, in executing instructions of a page fault handler routine in the first instruction pipeline, from a storage interface controller that couples the processor component to the slower speed storage device retrieval of the next page from the slower speed storage device in response to the page fault.

In Example 30, which includes the subject matter of any of Examples 22-29, the method may include receiving, at the lower power core, a transmission of the interrupt from the storage interface controller along with an identifier of the storage interface controller as a source of the interrupt, and the storage interface controller may transmit the interrupt in response to receiving a block of data from the slower speed storage device.

In Example 31, which includes the subject matter of any of Examples 22-30, the method may include using, by the lower power core, the identifier to retrieve multiple addresses of multiple handler routines from an interrupt descriptor table (IDT), where the multiple handler routines may include the handler routine and the multiple addresses may include the address of the handler routine; and executing in the first instruction pipeline, instructions of each handler routine of the multiple handler routines at the multiple addresses to identify the storage interface controller as the source of the interrupt.

In Example 32, which includes the subject matter of any of Examples 22-31, the method may include retrieving, in executing instructions of the handler routine in the first instruction pipeline, multiple blocks of data from multiple blocks of data stored within a block buffer by the storage interface controller; and storing, in executing instructions of the handler routine in the first instruction pipeline, the multiple blocks of data in a page buffer in an order that recreates the next page, the multiple blocks of data comprising the block of data.

In Example 33, which includes the subject matter of any of Examples 22-32, the method may include copying, in executing instructions of the second task in the second instruction pipeline, the next page from the page buffer to an application data buffer of the application routine stored in a user context separately from a system context of an operating system as the second task following recreation of the next page in the page buffer.

In Example 34, which includes the subject matter of any of Examples 22-33, the method may include remapping, in executing instructions of the second task in the second instruction pipeline, the next page from the page buffer within a system context of the operating system to a user context of the application routine as the second task following recreation of the next page in the page buffer.

In Example 35, an apparatus includes a lower power core of a processor component, the lower power core comprising a first instruction pipeline, and the lower power core to stop a first flow of execution in the first instruction pipeline and execute instructions of a page fault handler routine in the first instruction pipeline to perform a first task of handling a page fault; and a higher function core of the processor component, the higher function core comprising a second instruction pipeline, and the higher function core to execute instructions of an application routine in the second pipeline from a higher speed storage and to provide an indication of the page fault to the lower power core in response to storage of a next page of instructions of the application routine to be executed by the higher function core in a slower speed storage device and not in the higher speed storage.

In Example 36, which includes the subject matter of Example 35, the lower power core may consume electric power at a lower rate than the higher function core.

In Example 37, which includes the subject matter of any of Examples 35-36, the second instruction pipeline may include at least one of a greater quantity of stages of instruction execution than the first instruction pipeline or an ability to perform out-of-order execution of instructions not supported by the first instruction pipeline.

In Example 38, which includes the subject matter of any of Examples 35-37, the lower power core may include a first cache, the higher function core may include a second cache, and the second cache may include at least one of a greater quantity of cache lines than the first cache or a greater set associativity than the first cache.

In Example 39, which includes the subject matter of any of Examples 35-38, the apparatus may include a storage interface controller to couple the processor component to the slower speed storage device, and the lower power core to, in executing instructions of the page fault handler routine, request retrieval of the next page from the slower speed storage device.

In Example 40, which includes the subject matter of any of Examples 35-39, the apparatus may include a block buffer; and an interrupt router to receive a transmission of the interrupt from the storage interface controller and to relay an indication of receipt of the interrupt to the processor component along with an identifier of the storage interface controller as a source of the interrupt, the storage interface controller may transmit the interrupt to the interrupt router and to store a block of data in the block buffer in response to receiving the block of data from the slower speed storage device, and the block of data may include a portion of the next page.

In Example 41, which includes the subject matter of any of Examples 35-40, the apparatus may include an interrupt descriptor table (IDT), and the lower power core may employ the identifier to retrieve an address of a handler routine associated with the storage interface controller from the IDT.

In Example 42, which includes the subject matter of any of Examples 35-41, the lower power core, in executing instructions of the handler routine in the first instruction pipeline, may retrieve multiple pieces of data from multiple blocks stored within the block buffer and may store the multiple blocks of data in a page buffer in an order that recreates the next page, and the multiple blocks of data may include the block of data.

In Example 43, which includes the subject matter of any of Examples 35-42, the higher function core may remap the next page from the page buffer within a system context of an operating system to a user context of the application routine following recreation of the next page in the page buffer by the lower power core.

In Example 44, which includes the subject matter of any of Examples 35-43, the lower power core may remap the next page from the page buffer within a system context of an operating system to a user context of the application routine following recreation of the next page in the page buffer, and the higher function core may jump to the next page to continue execution of the application routine following remapping of the next page by the lower power core.

In Example 45, at least one machine-readable storage medium includes instructions that when executed by a processor component, may cause the processor component to stop a first flow of execution in a first instruction pipeline of a lower power core of the processor component in response to an interrupt; retrieve, by the lower power core, an address of a handler routine in response to the interrupt; execute instructions of the handler routine in the first instruction pipeline to perform a first task of handling the interrupt; schedule, by a higher function core of the processor component following performance of the first task by the lower power core, execution of instructions of a second task of the handling of the interrupt in a second instruction pipeline of the higher power core to follow a second flow of execution in the second instruction pipeline, the first task more time-sensitive than the second task.

In Example 46, which includes the subject matter of Example 45, the processor component may be caused to dynamically place the processor component in one of at least a first mode in which the lower power core and the higher function core are both operated to execute instructions, and a second mode in which the lower power core is operated to execute instructions and the higher function core is not operated to execute instructions, based on a level of demand for resources of the processor component; and select one of the lower power core and the higher function core to direct the interrupt to based on whether the processor component is placed in the first mode or the second mode.

In Example 47, which includes the subject matter of any of Examples 45-46, the processor component may be caused to receive, at the lower power core, a transmission of the interrupt from a network interface controller (NIC) that couples the processor component to a network along with an identifier of the NIC as a source of the interrupt, the NIC to transmit the interrupt in response to receiving a packet from the network.

In Example 48, which includes the subject matter of any of Examples 45-47, the processor component may be caused to use, by the lower power core, the identifier to retrieve multiple addresses of multiple handler routines from an interrupt descriptor table (IDT), where the multiple handler routines may include the handler routine and the multiple addresses may include the address of the handler routine; and execute in the first instruction pipeline, instructions of each handler routine of the multiple handler routines at the multiple addresses to identify the NIC as the source of the interrupt.

In Example 49, which includes the subject matter of any of Examples 45-48, the processor component may be caused to retrieve, in executing instructions of the handler routine in the first instruction pipeline, an identifier from each of multiple packets stored within the network packet buffer, and the identifier may indicate a flow of execution to which each packet of the multiple packets is directed.

In Example 50, which includes the subject matter of any of Examples 45-49, the processor component may be caused to generate, in executing instructions of the handler routine in the first instruction pipeline, a queue that lists one or more packets of the multiple packets associated with a destination flow of execution; and store, in executing instructions of the handler routine, the queue in a network queue buffer.

In Example 51, which includes the subject matter of any of Examples 45-50, the processor component may be caused to retrieve, in executing instructions of the second task in the second instruction pipeline, the queue; and copy, in executing instructions of the second task in the second instruction pipeline, data from the one or more packets listed in the queue from the network data buffer to an application data buffer of an application routine stored in a user context separately from a system context of an operating system, the application routine comprising the destination flow of execution.

In Example 52, which includes the subject matter of any of Examples 45-51, the processor component may be caused to retrieve, in executing instructions of an application routine in the second instruction pipeline, pages of instructions of the application routine to execute in the second instruction pipeline from a higher speed storage; detect, in executing instructions of the application routine in the second instruction pipeline, a page fault in which a next page of instructions of the application routine to be executed in the second instruction pipeline is stored in a slower speed storage device and not in the higher speed storage; and request, in executing instructions of a page fault handler routine in the first instruction pipeline, from a storage interface controller that couples the processor component to the slower speed storage device retrieval of the next page from the slower speed storage device in response to the page fault.

In Example 53, which includes the subject matter of any of Examples 45-52, the processor component may be caused to receive, at the lower power core, a transmission of the interrupt from the storage interface controller along with an identifier of the storage interface controller as a source of the interrupt, and the storage interface controller may transmit the interrupt in response to receiving a block of data from the slower speed storage device.

In Example 54, which includes the subject matter of any of Examples 45-53, the processor component may be caused to use, by the lower power core, the identifier to retrieve multiple addresses of multiple handler routines from an interrupt descriptor table (IDT), where the multiple handler routines may include the handler routine and the multiple addresses may include the address of the handler routine; and execute in the first instruction pipeline, instructions of each handler routine of the multiple handler routines at the multiple addresses to identify the storage interface controller as the source of the interrupt.

In Example 55, which includes the subject matter of any of Examples 45-54, the processor component may be caused to retrieve, in executing instructions of the handler routine in the first instruction pipeline, multiple blocks of data from multiple blocks of data stored within a block buffer by the storage interface controller; and store, in executing instructions of the handler routine in the first instruction pipeline, the multiple blocks of data in a page buffer in an order that recreates the next page, the multiple blocks of data comprising the block of data.

In Example 56, which includes the subject matter of any of Examples 45-55, the processor component may be caused to copy, in executing instructions of the second task in the second instruction pipeline, the next page from the page buffer to an application data buffer of the application routine stored in a user context separately from a system context of an operating system as the second task following recreation of the next page in the page buffer.

In Example 57, which includes the subject matter of any of Examples 45-56, the processor component may be caused to remap, in executing instructions of the second task in the second instruction pipeline, the next page from the page buffer within a system context of the operating system to a user context of the application routine as the second task following recreation of the next page in the page buffer.

In Example 58, at least one machine-readable storage medium may include instructions that when executed by a controller processor component, cause the computing device to perform any of the above.

In Example 59, an apparatus may include means for performing any of the above.

The invention claimed is:

1. An apparatus to control flows of execution comprising:
   a lower power core of a processor component, the lower power core comprising a first instruction pipeline and the lower power core to stop a first flow of execution in the first instruction pipeline and execute instructions of a handler routine in the first instruction pipeline to perform a first task of handling an interrupt; and
   a higher function core of the processor component, the higher function core comprising a second instruction pipeline and the higher function core to, following the performance of the first task, schedule execution of instructions of a second task of handling the interrupt in the second instruction pipeline to follow a second flow of execution in the second instruction pipeline, the first task more time-sensitive than the second task.

2. The apparatus of claim 1, comprising:
   a network packet buffer;
   a network interface controller (NIC) to couple the processor component to a network and to, in response to receiving a packet from the network, store the packet within the packet buffer and transmit the interrupt to the processor component; and
   an interrupt router to receive the transmission of the interrupt from the NIC and to relay an indication of receipt of the interrupt to the processor component along with an identifier of the NIC as a source of the interrupt.

3. The apparatus of claim 2, the lower power core, in executing instructions of the handler routine in the first instruction pipeline, to retrieve an identifier from each of multiple packets stored within the network packet buffer, the identifier to indicate a flow of execution to which each packet of the multiple packets is directed.

4. The apparatus of claim 3, the lower power core, in executing instructions of the handler routine in the first instruction pipeline, to generate a queue that lists one or more packets of the multiple packets associated with a destination flow of execution, and to store the queue in a network queue buffer.

5. The apparatus of claim 4, comprising a data transfer component of an operating system for execution by the higher function core as the second task to retrieve the queue and to copy data from the one or more packets listed in the queue from the network data buffer to an application data buffer of an application routine stored in a user context separately from a system context of the operating system, the application routine comprising the destination flow of execution.

6. A computer-implemented method for controlling flows of execution comprising:
   stopping a first flow of execution in a first instruction pipeline of a lower power core of a processor component in response to an interrupt;
   retrieving, by the lower power core, an address of a handler routine in response to the interrupt;
   executing instructions of the handler routine in the first instruction pipeline to perform a first task of handling the interrupt; and
   scheduling, by a higher function core of the processor component following performance of the first task by the lower power core, execution of instructions of a second task of the handling of the interrupt in a second instruction pipeline of the higher power core to follow a second flow of execution in the second instruction pipeline, the first task more time-sensitive than the second task.

7. The computer-implemented method of claim 6, the method comprising:
   dynamically placing the processor component in a first mode in which the lower power core and the higher function core are both operated to execute instructions, or a second mode in which the lower power core is operated to execute instructions and the higher function core is not operated to execute instructions, based on a level of demand for resources of the processor component; and
   selecting the lower power core or the higher function core to direct the interrupt to based on whether the processor component is placed in the first mode or the second mode.

8. The computer-implemented method of claim 6, the method comprising:
   retrieving, in executing instructions of an application routine in the second instruction pipeline, pages of instructions of the application routine to execute in the second instruction pipeline from a higher speed storage;
   detecting, in executing instructions of the application routine in the second instruction pipeline, a page fault in which a next page of instructions of the application routine to be executed in the second instruction pipeline is stored in a slower speed storage device and not in the higher speed storage; and
   requesting, in executing instructions of a page fault handler routine in the first instruction pipeline, from a storage interface controller that couples the processor component to the slower speed storage device retrieval of the next page from the slower speed storage device in response to the page fault.

9. The computer-implemented method of claim 8, the method comprising receiving, at the lower power core, a transmission of the interrupt from the storage interface controller along with an identifier of the storage interface controller as a source of the interrupt, the storage interface controller to transmit the interrupt in response to receiving a block of data from the slower speed storage device.

10. The computer-implemented method of claim 9, the method comprising:
    retrieving, in executing instructions of the handler routine in the first instruction pipeline, multiple blocks of data from multiple blocks of data stored within a block buffer by the storage interface controller; and
    storing, in executing instructions of the handler routine in the first instruction pipeline, the multiple blocks of data in a page buffer in an order that recreates the next page, the multiple blocks of data comprising the block of data.

11. The computer-implemented method of claim 10, the method comprising remapping, in executing instructions of the second task in the second instruction pipeline, the next page from the page buffer within a system context of the operating system to a user context of the application routine as the second task following recreation of the next page in the page buffer.

12. An apparatus to control flows of execution comprising:
a lower power core of a processor component, the lower power core comprising a first instruction pipeline, and the lower power core to stop a first flow of execution in the first instruction pipeline and execute instructions of a page fault handler routine in the first instruction pipeline to perform a first task of handling a page fault; and
a higher function core of the processor component, the higher function core comprising a second instruction pipeline, and the higher function core to execute instructions of an application routine in the second pipeline from a higher speed storage and to provide an indication of the page fault to the lower power core in response to storage of a next page of instructions of the application routine to be executed by the higher function core in a slower speed storage device and not in the higher speed storage.

13. The apparatus of claim 12, comprising a storage interface controller to couple the processor component to the slower speed storage device, and the lower power core to, in executing instructions of the page fault handler routine, request retrieval of the next page from the slower speed storage device.

14. The apparatus of claim 13, comprising:
a block buffer; and
an interrupt router to receive a transmission of the interrupt from the storage interface controller and to relay an indication of receipt of the interrupt to the processor component along with an identifier of the storage interface controller as a source of the interrupt, the storage interface controller to transmit the interrupt to the interrupt router and to store a block of data in the block buffer in response to receiving the block of data from the slower speed storage device, the block of data comprising a portion of the next page.

15. The apparatus of claim 14, comprising an interrupt descriptor table (IDT), the lower power core to employ the identifier to retrieve an address of a handler routine associated with the storage interface controller from the IDT.

16. The apparatus of claim 15, the lower power core, in executing instructions of the handler routine in the first instruction pipeline, to retrieve multiple pieces of data from multiple blocks stored within the block buffer and to store the multiple blocks of data in a page buffer in an order that recreates the next page, the multiple blocks of data comprising the block of data.

17. The apparatus of claim 16, the lower power core to remap the next page from the page buffer within a system context of an operating system to a user context of the application routine following recreation of the next page in the page buffer, and the higher function core to jump to the next page to continue execution of the application routine following remapping of the next page by the lower power core.

18. At least one tangible machine-readable storage medium comprising instructions that when executed by a processor component, cause the processor component to:
stop a first flow of execution in a first instruction pipeline of a lower power core of the processor component in response to an interrupt;
retrieve, by the lower power core, an address of a handler routine in response to the interrupt;
execute instructions of the handler routine in the first instruction pipeline to perform a first task of handling the interrupt; and
schedule, by a higher function core of the processor component following performance of the first task by the lower power core, execution of instructions of a second task of the handling of the interrupt in a second instruction pipeline of the higher power core to follow a second flow of execution in the second instruction pipeline, the first task more time-sensitive than the second task.

19. The at least one tangible machine-readable storage medium of claim 18, the processor component caused to receive, at the lower power core, a transmission of the interrupt from a network interface controller (NIC) that couples the processor component to a network along with an identifier of the NIC as a source of the interrupt, the NIC to transmit the interrupt in response to receiving a packet from the network.

20. The at least one tangible machine-readable storage medium of claim 19, the processor component caused to retrieve, in executing instructions of the handler routine in the first instruction pipeline, an identifier from each of multiple packets stored within the network packet buffer, the identifier indicating a flow of execution to which each packet of the multiple packets is directed.

21. The at least one tangible machine-readable storage medium of claim 20, the processor component caused to:
generate, in executing instructions of the handler routine in the first instruction pipeline, a queue that lists one or more packets of the multiple packets associated with a destination flow of execution; and
store, in executing instructions of the handler routine, the queue in a network queue buffer.

22. The at least one tangible machine-readable storage medium of claim 21, the processor component caused to:
retrieve, in executing instructions of the second task in the second instruction pipeline, the queue; and
copy, in executing instructions of the second task in the second instruction pipeline, data from the one or more packets listed in the queue from the network data buffer to an application data buffer of an application routine stored in a user context separately from a system context of an operating system, the application routine comprising the destination flow of execution.

23. The at least one tangible machine-readable storage medium of claim 18, the processor component caused to:
retrieve, in executing instructions of an application routine in the second instruction pipeline, pages of instructions of the application routine to execute in the second instruction pipeline or data associated with the application routine from a higher speed storage;
detect, in executing instructions of the application routine in the second instruction pipeline, a page fault in which a next page of instructions of the application routine to be executed in the second instruction pipeline or of data is stored in a slower speed storage device and not in the higher speed storage; and
request, in executing instructions of a page fault handler routine in the first instruction pipeline, from a storage interface controller that couples the processor component to the slower speed storage device retrieval of the next page from the slower speed storage device in response to the page fault.

24. The at least one tangible machine-readable storage medium of claim 23, the processor component caused to receive, at the lower power core, a transmission of the interrupt from the storage interface controller along with an identifier of the storage interface controller as a source of the interrupt, the storage interface controller to transmit the interrupt in response to receiving a block of data from the slower speed storage device.

25. The at least one tangible machine-readable storage medium of claim 24, the processor component caused to:
retrieve, in executing instructions of the handler routine in the first instruction pipeline, multiple blocks of data from multiple blocks of data stored within a block buffer by the storage interface controller; and
store, in executing instructions of the handler routine in the first instruction pipeline, the multiple blocks of data in a page buffer in an order that recreates the next page, the multiple blocks of data comprising the block of data.

\* \* \* \* \*